US011886557B1

(12) United States Patent
Thanh Tran

(10) Patent No.: US 11,886,557 B1
(45) Date of Patent: Jan. 30, 2024

(54) METHOD AND BLOCKCHAIN-BASED SYSTEM FOR MANAGING CREDENTIALS IN BATCH WITH SELECTIVE ATTRIBUTES DISCLOSURE/HIDING AND AUDITABLE MERKLE TREE

(71) Applicant: Tung Thanh Tran, Ho Chi Minh (VN)

(72) Inventor: Tung Thanh Tran, Ho Chi Minh (VN)

(73) Assignees: Vietnam National University Ho Chi Minh City, Ho Chi Minh (VN); International University (IU)—Vietnam National University HCM City, Ho Chi Minh (VN)

( * ) Notice: Subject to any disclaimer, the term of this patent is extended or adjusted under 35 U.S.C. 154(b) by 0 days.

(21) Appl. No.: 18/296,888

(22) Filed: Apr. 6, 2023

(51) Int. Cl.
*G06F 21/31* (2013.01)

(52) U.S. Cl.
CPC .................................. *G06F 21/31* (2013.01)

(58) Field of Classification Search
CPC .......... G06F 21/31; H04L 9/50; H04L 9/3239; H04L 2209/56
See application file for complete search history.

(56) References Cited

U.S. PATENT DOCUMENTS

| | | | |
|---|---|---|---|
| 11,734,259 B2 * | 8/2023 | Saket | H04L 9/3228 707/703 |
| 2019/0268140 A1 * | 8/2019 | Kandiraju | H04L 9/3265 |
| 2019/0279160 A1 * | 9/2019 | Whitney | G06Q 10/1053 |
| 2020/0013050 A1 * | 1/2020 | Finlow-Bates | H04L 9/3239 |
| 2020/0322132 A1 * | 10/2020 | Covaci | H04L 9/0637 |
| 2021/0281421 A1 * | 9/2021 | Semenovskiy | H04L 9/3247 |
| 2021/0357893 A1 * | 11/2021 | Kang | G06Q 20/1235 |
| 2022/0207022 A1 * | 6/2022 | Wood | G06F 8/65 |
| 2022/0376919 A1 * | 11/2022 | Goshon | H04L 9/50 |
| 2023/0048583 A1 * | 2/2023 | Kohlmann | G07F 17/3225 |

OTHER PUBLICATIONS

Bruschi et al., "Tunneling Trust Into the Blockchain: A Merkle Based Proof System for Structured Documents," IEEE Access Year: 2021 | vol. 9 | Journal Article | Publisher: IEEE.*
Westerkamp et al., "SmartSync: Cross-Blockchain Smart Contract Interaction and Synchronization," 2022 IEEE International Conference on Blockchain and Cryptocurrency (ICBC) Year: 2022 | Conference Paper | Publisher: IEEE.*

* cited by examiner

*Primary Examiner* — Roderick Tolentino

(57) ABSTRACT

A blockchain based system for managing credentials in batch with selective attributes disclosing/hiding capability and auditable Merkle tree are disclosed with include a SmartCert unit coupled to a blockchain ecosystem and a public key infrastructure (PKI); the SmartCert unit further includes an issuer SmartCert and SmartCert verifier interface so that the holder can select to hide optional components completely from the verifier; and the verifier can check the certificate using the auditable Merkle tree.

18 Claims, 16 Drawing Sheets

```
 1   pragma solidity >=0.7.0 <0.9.0;        ← 301
 2   import './Ownable.sol';
 3
 4   contract Cert is Ownable {        ← 302
 5       bytes32 public immutable institute;        ← 303
 6       bytes32 public immutable MTRoot;        ← 303
 7       uint256 public immutable Attribute1;        ← 304
 8       uint256 public immutable Attribute2;        ← 305
 9
10       mapping(bytes32 => string) revocationList;        ← 306
11
12       constructor(bytes32 _institute, bytes32 _MTRoot, uint256 _Attribute1, uint256 _Attribute2) {        ← 311
13           institute = _institute;
14           MTRoot = _MTRoot;
15           Attribute1 = _Attribute1;
16           Attribute2 = _Attribute2;
17       }
18
19       function revoke(        ← 312
20           bytes32 mandatoryComponent,
21           string memory reason
22       ) public onlyOwner {
23           ...
24       }
25
26       function isValid(bytes32 credentialMandatoryComponent)        ← 313
27           public
28           view
29           returns (bool, string memory)
30       {
31           ...
32       }
33
34       function verify(bytes32[] memory proof, bytes32 leaf)
35           public
36           view
37           returns (bool)        ← 314
38       {
39           ...
40       }
41   }
```

FIG. 3

```
{
    "issuedOn": "2021-09-28T16:19:20.144Z",
    "transactionHash": "0xb79cd0cac973c64c3b0",
    "contractAddress": "0xc61bA3096848b1f24d5",
    "credentialID": "MIT01",
    "sections": [
        {
            "name": "l1CertificateOfAchievem",
            "mandatory": true,
            "proof": [
                "0x789397657c85e9e30ad9d3d4da",
                "0xebecc5b3ef32f349f0d333151d"
            ],
            "hash": "0xc19208be77ade0a088c22e"
        },
        {
            "name": "l2Transcript",
            "mandatory": false,
            "proof": [
                "0xa61f759b812a72e4beb8938400"
            ],
            "hash": "0x9057aa57118f7792106e2f"
        },
        ┌┄┄┄┄┄┄┄┄┄┄┄┄┄┄┄┄┄┄┄┄┄┄┄┄┐
        ┆{                          ┆
        ┆    "name": "l3ScienceProfile",┆
        ┆    "mandatory": false,   ┆
        ┆    "proof": [            ┆
        ┆        "0x823ff5dcae7962909e62a857cf1",┆
        ┆        "0xebecc5b3ef32f349f0d333151d"┆
        ┆    ],                    ┆
        ┆    "hash": "0xc4e82efb3f300e3ea68739"┆
        ┆}                          ┆
        └┄┄┄┄┄┄┄┄┄┄┄┄┄┄┄┄┄┄┄┄┄┄┄┄┘
    ],
    "issuer": {
        "ethereumAccount": "0x64A695469E5999E",
        "ethereumAccountSignature": "aVtSbRYE",
        "issuerCertificateChain": "-----BEGIN
    }
}
```

```
{
    "issuedOn": "2021-09-28T16:19:20.144Z",
    "transactionHash": "0xb79cd0cac973c64c3b0",
    "contractAddress": "0xc61bA3096848b1f24d5",
    "credentialID": "MIT01",
    "sections": [
        {
            "name": "l1CertificateOfAchievem",
            "mandatory": true,
            "proof": [
                "0x789397657c85e9e30ad9d3d4da",
                "0xebecc5b3ef32f349f0d333151d"
            ],
            "hash": "0xc19208be77ade0a088c22e"
        },
        {
            "name": "l2Transcript",
            "mandatory": false,
            "proof": [
                "0xa61f759b812a72e4beb8938400"
            ],
            "hash": "0x9057aa57118f7792106e2f"
        }
    ],
    "issuer": {
        "ethereumAccount": "0x64A695469E5999E",
        "ethereumAccountSignature": "aVtSbRYE",
        "issuerCertificateChain": "-----BEGIN
    }
}
```

FIG.5B

METHOD AND BLOCKCHAIN-BASED SYSTEM FOR MANAGING CREDENTIALS IN BATCH WITH SELECTIVE ATTRIBUTES DISCLOSURE/HIDING AND AUDITABLE MERKLE TREE

This application claims priority under 35 U.S.C. § 119(a) of the patent application No. 1-2022-07433, entitled "Phu'o'ng Pháp, Hệ Thống Quản Lý Chứng Chỉ Số Được Lựa Chọn Bộc Lộ Trên Nền Chuỗi Khối", by the same inventor Tung Thanh Tran, filed on Nov. 14, 2022 in the Republic Socialist of Vietnam. The patent application identified above is incorporated in its entirety herein to provide continuity of disclosure.

FIELD OF THE INVENTION

The invention relates to blockchain-based self-sovereign identity (SSI) technology. More specifically this invention relates to methods and systems for managing credentials with selective disclosure/hiding on a blockchain ecosystem.

BACKGROUND OF THE INVENTION

Credentials are one of the important supporting documents for a job application and/or admission application. Employers and/or admission officials often rely on these credentials to screen out applicants. Often, after in person interviews, the hiring decision is based solely on the review of the applicants' credentials. Therefore, there exists the risks of using fraudulent credentials, which entails costs to the society.

Traditionally, to combat the use of fraudulent credentials, the triangulation method has been used. The process usually begins with the applicants asking for certified or a notarized copies of the credentials. After that, the applicants submit the certified copies and attach the original credentials for the stake holders (employers and universities) to verify and review. However, the employers and universities still do not completely trust the certified copies and need to take an additional steps of reconfirming by contacting the issuers or credential authorities. Such a process takes a lot of time and money for the stake holders.

Therefore, using blockchain technology to solve the above described problems has been investigated. The distributed ledger technology (DLT) is leveraged to issue and secure academic credentials. Blockcert [11] was the first important open-source system using Bitcoin blockchain [15] for transactions of academic credentials. The project was a collaboration between the MIT Media Lab Learning Initiative and Learning Machine in 2016. Blockcert defines procedures for creating, exchanging, and verifying academic credentials. The credential includes information about the issuer, information about the learner, the issue date, and the achievement of the learner. The credential is signed and published to a blockchain platform, hence a relying party can validate it. Since 2017, many pilot projects using Blockcerts for education purpose have been developed in Malta [5], and Italy [2]. This suggests that the use of blockchain technology for education is sufficiently mature for official adoption.

Several authors [7,8,16,17,19] furthered the Blockcert idea by using smart contracts on Ethereum blockchain network [20]. The Blockchain for education platform [8] improved the security and the privacy of the issuing procedures, especially the identity of issuers. In the same year, EduCTX [19] proposed to use blockchain to enable credit transfer among higher education institutions. The system defined procedures to manage academic credentials at a finer gain such as the score and the credit of a course. In the same theme, the Knowledge Institute, Open University in the UK has developed smart contracts to document educational micro-credentials [7].

These studies have shown that blockchain technology can overcome the limitation of traditional paper-based credentials. It helps issuers to ensure the integrity of the credentials, and also helps the relying parties to verify credentials without contacting issuers, by that it reduces administrative bureaucracy.

Recently, in the report of the European Union [7] and the latest report of the American Council on Education of US [12], the key themes of the next generation of applications using blockchain for education are about issuing and verifying credentials, and empowering lifelong learning and data privacy.

In an article entitled, "Blockchain-based Verifiable Credential Sharing with Selective Disclosure" by Rham Mukta et al., published on Jun. 4, 2021, 2020 IEEE 19th International Conference on Trust, Security and Privacy in Computing and Communications (TrustCom) (hereinafter as "Mukta"), the "CreChain" for issuing credential with selective disclosure option based on blockchain is presented. The CreChain uses redactable signature technique to redact the credential of a student. The Sign( ) and Redact ( ) functions are therefore called to execute each time the redaction is needed. As a result, Mukta's CreChain system still shows the existence of the redacted attributes. These redacted attributes are conspicuous and often raise questions in the minds of the verifiers, which are disadvantageous to the students. In addition, the data structure embodied in the Merkle tree shown in FIG. 3 in the Mukta article is for only one credential and not verifiable. When the SSI platform receives the private key to the root node of the Merkle tree, it does not reveal the summary of the entire set of the credentials. As a consequence, the Mukta's CreChain builds a tree structure for each credential but cannot issue more than one credentials (credentials in batch). This causes the costs of issuance to be proportional to the number of credentials in the Mukta's CreChain system.

Therefore, what is needed is a new blockchain-based system and a method capable of selectively hiding attributes (components) of credentials that the holders do not want the verifiers to see and know.

What is needed is a new blockchain-based system and a method for issuing credentials with multiple parts and selective disclosures/hiding option in a friendly graphic user interface (GUI) or front-end application or browser page.

What is needed is a new blockchain-based system and a method for issuing a plurality of credentials in batch and at the same time verifying credentials that include auditable Merkle trees which are capable of calculating and verifying the information of the plurality of credentials.

Furthermore, what is needed is a new blockchain-based system and a method for issuing credentials and for revoking credentials on demand including revocation reason.

What is needed is a new blockchain-based system and a method that are user friendly, efficient, and cost effective.

SUMMARY OF THE INVENTION

The invention relates to methods and systems for managing credentials with selective disclosure on a block chain system. Aspects of the present invention can be used to save time, effort, and management cost of the credentials issuing process while ensuring their security and privacy; to issue credentials with multiple parts and selective disclosures option while maintaining the validity and integrity of credentials; to secure procedures for issuing credentials with multiple parts, for verifying credentials of verifier without the involvement of the issuer, hence saving time and effort for verifiers, employers, and holders; to selectively disclose credentials; and also to revoke credentials on demand.

An object of the present invention is to provide a new blockchain-based system and a method configured to define and issue credentials with mandatory components and optional components for selective sharing/hiding.

Another object of the present invention is to provide a blockchain-based system and a method for verifying and validating a credential.

Another object of the present invention is to provide a blockchain-based system and methods for selecting optional components of the credential to disclose, and as a consequence, to automatically hide the non-selected optional components from view.

Another object of the present invention is to provide a blockchain-based system and a method capable of revoking a credential and of providing reasons for revocation.

Yet another object of the present invention is to provide a blockchain-based system and a method capable of independently checking the integrity and validity of a credential.

Yet another object of the present invention is to provide a blockchain-based system and a method capable of providing security to the entire self-selecting process.

Yet another object of the present invention is to provide a blockchain-based system and a method for constructing an auditable Merkle tree capable of providing attribute information at the root node.

These and other advantages of the present invention will no doubt become obvious to those of ordinary skill in the art after having read the following detailed description of the preferred embodiments, which are illustrated in the various drawing figures.

BRIEF DESCRIPTION OF DRAWINGS

The accompanying drawings, which are incorporated in and form a part of this specification, illustrate embodiments of the invention and, together with the description, serve to explain the principles of the invention.

FIG. 3 shows a Solidity code listing of a smart contract in the system in accordance with an exemplary embodiment of the present invention.

FIG. 5A shows a receipt that shows a mandatory component and optional components in accordance with an exemplary embodiment of the present invention.

FIG. 5B shows a holder receipt capable of hiding an optional component in accordance with an exemplary embodiment of the present invention.

DETAILED DESCRIPTION OF THE INVENTION

Figure 1:
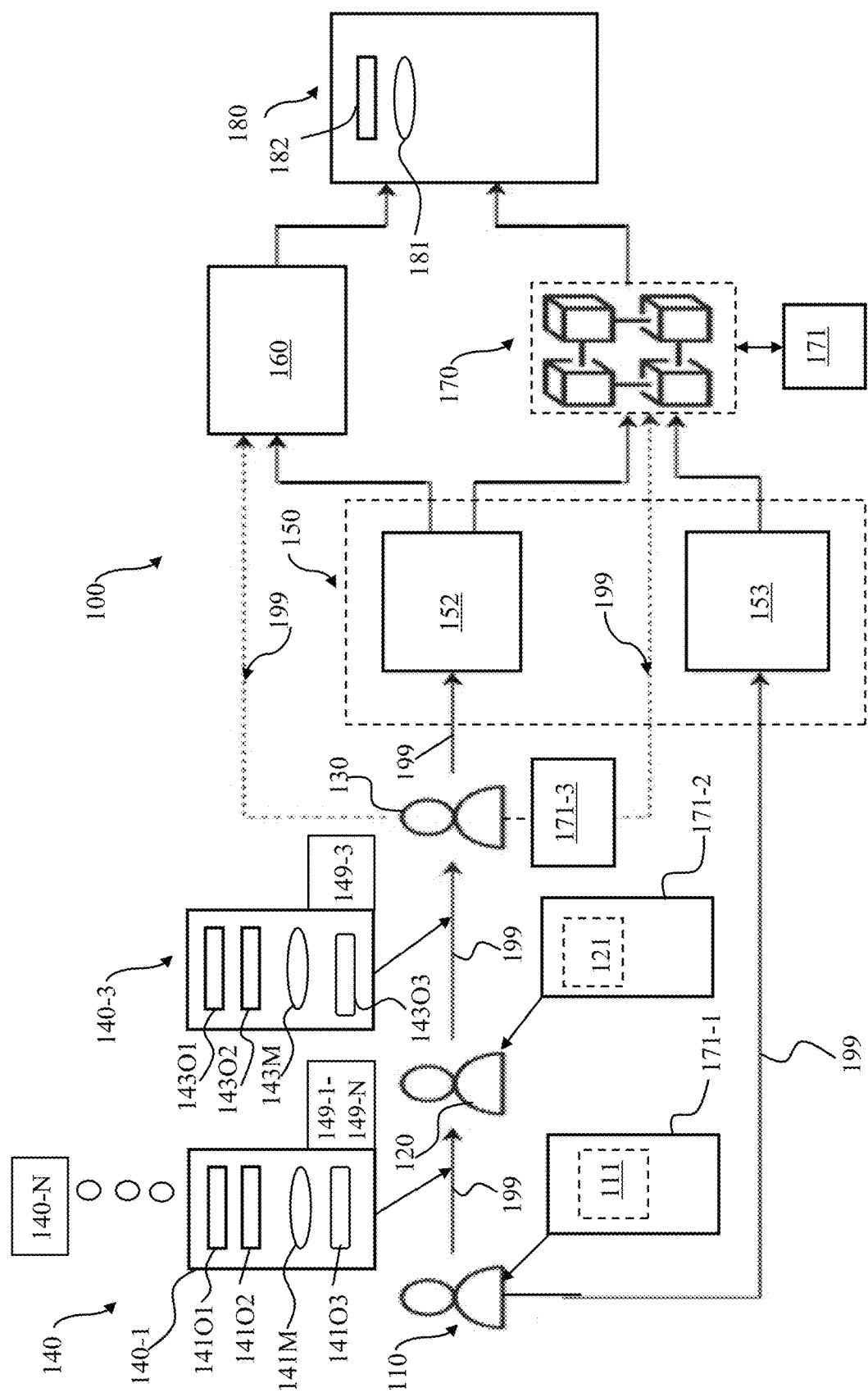
FIG. 1 shows a schematic diagram of a blockchain-based system for managing digital credentials with a selective hiding option that completely conceals the selected attributes from the verifiers and that provides an auditable Merkle tree among other things in accordance with an exemplary embodiment of the present invention.

Within the scope of the present description, the reference to "an embodiment" or "the embodiment" or "some embodiments" means that a particular feature, structure or element described with reference to an embodiment is comprised in at least one embodiment of the described object. The sentences "in an embodiment" or "in the embodiment" or "in some embodiments" in the description do not therefore necessarily refer to the same embodiment or embodiments. The particular feature, structures or elements can be furthermore combined in any adequate way in one or more embodiments.

Within the scope of the present invention Within the scope of the present description, the word "communication link" includes peer to peer (P2P) communication links in distributed, decentralized, consensus-driven networks such as world wide web internet, cloud, data center, or any network including a nano-network, a body area network (BAN), a personal area network (PAN), local area network (LAN), campus/corporate area network (CAN), metropolitan area network (MAN), wide area network (WAN), and area network, or any combination of them. The communication links are the internets with open protocols including HTTP, TCP/IP, Ethernet, SSL/TSL, 3COM, CISCO, Amazon, Paypal, Chrome, Bin, etc.

Within the scope of the present description, the word "digital credential" includes legally valid certificates and certificates issued by the competent authorities (hereinafter referred to as "issuers" such as educational institutions granting degrees and training certificates. (Universities, colleges, higher education institutes, public or private high schools, prep schools); banks that issue certificates of deposits such as passbooks, certificates of deposits, corporate bonds, etc.; the land and environment agency issues real estate certificates such as certificates of land use rights, trust deeds, and other assets attached to the land.

Within the scope of the present description, the words "block chain ecosystem" shall be understood as a network based on a consensus-driven, immutable, trustless distributed ledger technology (DLT) that uses interplanetary files storage (IPFS) which is an open-source and implements Merkle tree that allows computers to join and use this centralized file system, and in coordination with the X.509 public key infrastructure (PKI).

Within the scope of the present invention, the term "Ethereum platform" refers to a blockchain system that is accessed by logging into a world web web and using its libraries to programmatically create smart contracts using Solidity programming language and/or Javascript with compiler and Ethereum Virtual Machine (EVM).

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, and components have not been described in detail so as not to unnecessarily obscure aspects of the present invention.

Now referring to FIG. 1, a blockchain-based credential system with selective disclosure and auditable Merkle tree 100 ("system 100") in accordance with an exemplary embodiment of the present invention is illustrated. Architecturally, at the highest level, as shown in Table 1, system 100 includes a user layer, an application layer, a service layer, a data layer, and a communication layer. System 100 includes a graphic user interface (GUI or front end or browser) 171, a UI-certification unit 150, a public key infrastructure (PKI) 160, and a blockchain ecosystem 170. Graphic user interface 171 further comprises an issuer graphic user interface (I-GUI, front end, browser) 171-1, a holder graphic user interface (H-GUI, front-end, browser) 171-2, and a verifier graphic user interface (V-GUI, front-end, browser) 171-3. Alternatively, these GUIs (front-ends or browsers) are also known as application front-ends in the application layer. UI-certification unit 150 includes a verifier certification unit 152 and an issuer certification unit 153. In many aspects of the present invention verifier certification unit 152 and issuer certification unit 153 are Solidity programming codes written from Ethereum libraries and other programming languages such as C++, JavaScript, and Python.

System 100 is designed for three main groups of users: one or more issuers 110 (issuer 110), one or more holders 120 (holder 120), and one or more verifiers 130 (verifier 130)—all in the user layer. In many aspects of the present invention, issuer 110 broadly includes individuals, organizations, institutions, and companies that have the authority to issue credentials. Issuer 110 includes universities, institutions, and/or government offices. Holder 120 is a person who receive the earned certificate/diploma from issuer 110. Holder 120 includes institutions, a certificate/diploma grantees such as students, companies, and/or universities. In non-limiting example, holder 120 may also include a university that is received an official accreditation certificate. Verifier 130 refers to those who verify the correctness and integrity of the certificates. Verifier 130 includes credential users such as employers, institutions, universities who verify the credentials of holder 120. In various aspects of the present invention, credentials are referred to as degrees, certificates, accreditation, transcripts, patent portfolio, trust deeds, stock portfolio, investment portfolio, or any official papers that certify the background, the net worth, and the proficiency of some entities. Issuer 110, holder 120, and verifier 130 are stakeholders of system 100.

TABLE 1

System architecture.

| Components | Layers |
|---|---|
| Issuer | User Layer |
| Holder | User Layer |
| Verifier | User Layer |
| Batch of Certificates | Application Layer |
| First Certificate | Application Layer |
| $N^{th}$ certificate | Application Layer |
| Mandatory component (attributes) | Application Layer |
| Certificate Hash value | Service layer |
| UI-[[SmartCert]] certification unit | Service Layer |
| Verifier [[SmartCert]] certification unit | Service Layer |
| Issuer [[SmartCert]] certification unit | Service Layer |
| Public Key Infrastructure (PKI) | Service Layer |
| Blockchain ecosystem | Data Layer |
| Graphic User Interface (GUI) | Application Layer |
| Issuer GUI, browser, front-end | Application Layer |
| Holder GUI, browser, front-end | Application Layer |
| Verifier GUI, browser, front-end | Application Layer |
| Application Front-end, browser, GUI | Application Layer |
| Wallet | Data Layer |
| Web3 | Communication Layer |
| Ethereum | Service Layer |
| Solidity | Service |
| Communication Link | Communication Layer |

Continuing with FIG. 1, system 100 includes I-GUI 171-1 for issuer 110, H-GUI 120 for holder 120, and verifier GUI 171-3 for verifier 130. Issuer 110 has the power to issue certificates 140 including a first certificate 140-1, a second certificate 140-2, . . . and an $N^{th}$ certificate 140-N each with corresponding hash values 149-1, 149-2, . . . 149-N respectively. Each certificate 140-1 to 140-9 includes mandatory component(s) 141M and optional components 141O1 and 141O2. It is noted that the number of optional components 141O1 to 141O2 may be different in each certificate 140-1 to 140-N. Holder 140 uses H-GUI (web browser) 171-1 to request a certificate 140-3 among certificates 140-1 to 140-N. Certificate 140-3 includes a mandatory component (or attribute) 143M, and optional components 143O1 (Transcript) and 143O2 (ScienceProfile). Optional components 143O1-143O2 are those components (attributes) of certificate 140-3 among certificates 140-1 to 140-9 that can be made completely invisible from verifier 130. Certificate 140-3 has a hash value 149-3. Issuer 110 selects credential 140-3 and creates a schema that allows holders to select optional components 143O1 to 143O2. Consequently a receipt 111 is generated by blockchain ecosystem 170 for issuer 110.

Continuing with FIG. 1, Holder 120 uses H-GUI 171-2 to view and select optional components 140O1. A student receipt 121 is then issued after the selection. Holder 120 sends both certificate 140-3 and its corresponding student receipt 121 to verifiers 130 via a communication link 199. Communication link 199 connects certification unit 150 of the present invention to a PKI 160 and blockchain ecosystem 170 together in a decentralized network. Holder 120 receives student receipt 121 as a result of his or her request and selection. In response to holder 120 requests, issuer 110 uses issuer I-GUI 171-1 to send certificate 140-3 and receipt 121 to holder 120 via communication link 199. Before that, issuer 110 also forwards their responses to issuer certification unit 153. Verifier 130 logs in their V-GUI 171-3 to receive digital certificate 140-3, a smart contract, issuer receipt 111, and student receipt 121. Verifiers 130 use verifier certification unit 152 to verify certificate 140-3. Verifier] certification unit 152, issuer certification unit 153, I-GUI 171-1, H-GUI 171-2, and V-GUI 171-3 are programmatically created and linked to blockchain ecosystem 170 and PKI unit 160 to perform the functions disclosed in the present invention.

Referring again to FIG. 1, in some aspects of the present invention, successfully verified credentials 180 in system 100 include two components: mandatory component 181 and a selected optional components 182. Mandatory component 181 is one that holder 120 must disclose to verifier 130. These mandatory components 181 store all information needed to validate and evaluate credential 180. Another example, in a credential of an undergraduate student (holder 120), the mandatory components 181 of a diploma which contains the name of the university, the name of the student, the issued date, the enrollment year, and the name of the training program or major. The selected optional component 182 includes a Transcript and is made visible to holder 130. The unselected optional component 183 may include the student ScienceProfile and is made invisible to verifier 130. Optional components 182-183 are enclosed in a tool for issuer 110 to define a flexible credential data that can be made completely invisible to verifier 130. Issuer 110 issues credentials with different granularities called attributes or components. In accordance to many preferred embodiments of the present invention, optional components 182-183 allow holder 120 to selectively hide attributes these attributes from verifier 130. In another non-limiting example, a university (issuer 110) issues a transcript of a student (holder 120) by issuing the grade point average (GPA) of each course separately as a list of optional components. This credential schema allows the student (holder 120) to choose courses to disclose to verifiers 130 and completely hide those courses that he or she does not want verifier 130 to see. Conversely, if a university (issuer 110) does not want the students (holders 120) to select courses to disclose, the university (issuers 110) may select the entire transcript as a single component of the credential. Moreover, in situations when the student (holder 110) must disclose the transcript along with their diploma, the university (issuer 110) can combine the diploma and the transcript into a single mandatory component of the credential.

The present disclosure uses two optional components "Transcript" and "ScienceProfile" to select/hide by holder 120 for the sake of simplicity. However, it is understood that a plurality of optional components such as classes and GPA and much more are within the scope of the present invention.

As seen above system 100 achieves the following objectives: (a) issuing credentials in batch 140-1, 140-2, to 140-N with a mandatory components 141M and a list of optional components 141O1 to 141O2 for selective disclosure/hiding, (b) ensuring the security of the credentials including confidentiality, integrity, non-repudiation; and (c) verifying the validity and integrity of the credentials, the origin of the credential independently without contacting issuer 110; (d) revoking a credential issued by system 100; and (e) the reason for revocation is also available.

Figure 2:
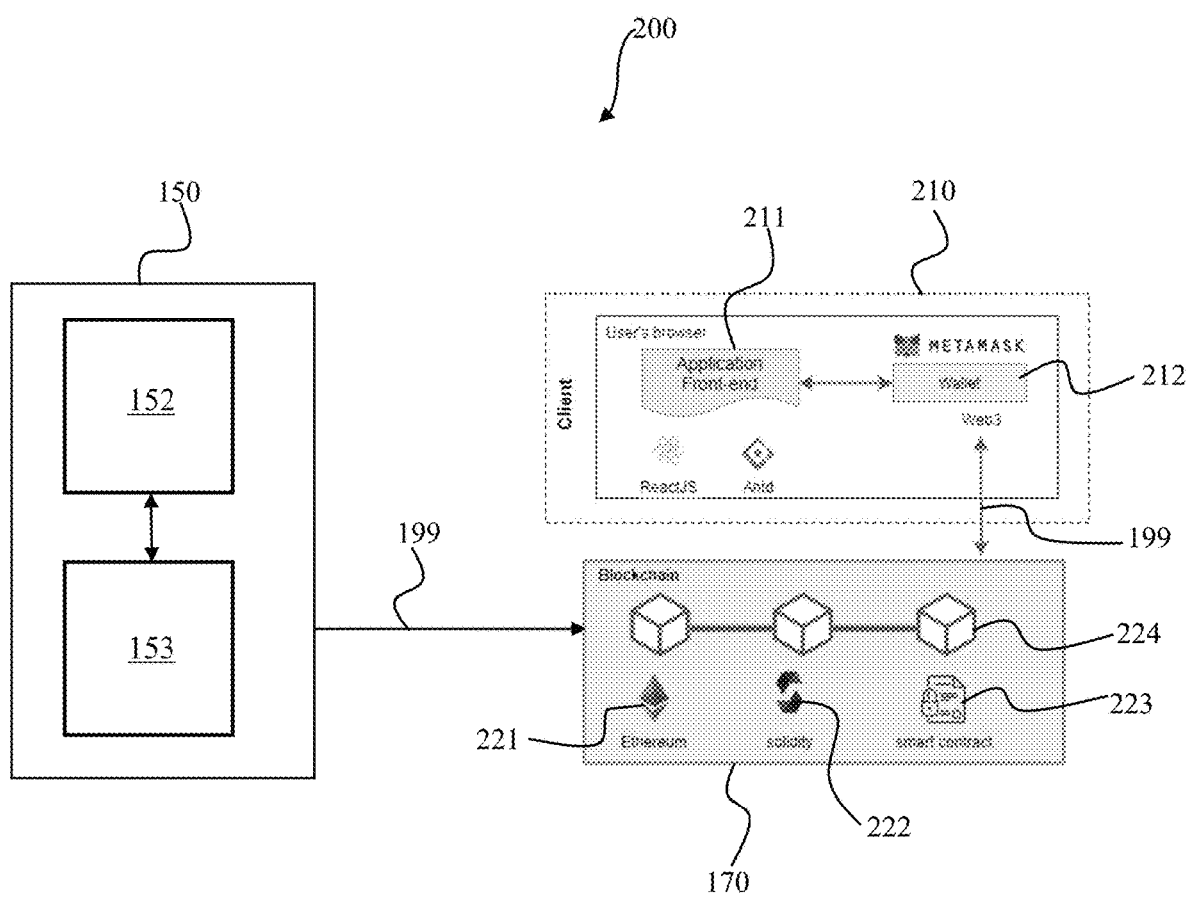
FIG. 2 shows the architecture of the certification unit built on blockchain system for managing digital credentials with a selective disclosure option ("system") in accordance with an exemplary embodiment of the present invention.

Next, referring to FIG. 2, a hardware/software architecture of a blockchain-based system with selecting option and auditable Merkle tree system 200 (system 200) in accordance with an exemplary embodiment of the present invention is illustrated. System 200 is mostly in the application layer. System 200 includes UIcertification unit 150, a user layer 210 connected to blockchain ecosystem 170. UI-SmartCert unit 150 includes a verifier certification unit 152 and an issuer certification unit 153. Issuer certification unit 153 is programmatically created and linked to Blockchain ecosystem 170 to perform the following functional steps (1) defining credential schema that includes mandatory components 141M, 143M, 181 and optional components such as 141O1-141O3,143O1-143O2, and 182; (2) constructing an auditable Merkle tree, see FIG. 6 and FIG. 7, (3) publishing data as a smart contract see FIG. 3, and (4) generating receipts such as issuer receipt 111 and student receipt 121.

More particularly, verifier certification unit 152 is programmatically created and linked to blockchain ecosystem 170 to perform the following functional steps (1) checking issuer receipt 111 and student receipt 121 the identity of issuer 110—The issuer 110's certificate—The signature of an Ethereum 221 account used to issue credentials 140-1, . . . 140-3, to 140-N, and 180—Validity of the owner of the smart contract on Ethereum platform 221.—The name of issuer 110 in receipts 111 and 121 (refer to FIG. 4 for further details) and the name on certificates 140-1,140-3 to 140-N, and 180. (2) checking the integrity of all components of the credentials 140-1, 140-3 to 140-N, and 180. This step checks the number, the type and the Hash value of the files against the value stored on student receipt 111 and issuer receipt 121; (3) checking the validity of the components 141O1-141O2 and 141M in certificates 140-1 to 140-N. This step checks the Hash value and proofs to confirm whether credential belongs to the auditable Merkle tree whose root node is published on Ethereum platform 221; and (4) checking whether a particular certificate such as 140-3 is revoked. This step checks if the mandatory component 141M of the credential 140-1 to 140-N in the list of revoked credentials stored in smart contract on the Ethereum platform 221.

User layer 210 is formed by application front end or GUI 211 for issuer 110, holder 120, and verifier 130. As disclosed in FIG. 1, application front end (GUI) 211 includes issuer I-GUI 171-1, H-GUI 171-2, and V-GUI 171-3. Each GUI 171 (i.e., 171-1, 171-2, and 171-3) is coupled to a Metask wallet 212 for storing credentials 180. User layer 210, certification engine 150 and blockchain ecosystem 170 are connected together via communication links 199.

Continuing with FIG. 2, in various aspects of the present invention, blockchain ecosystem 170 includes Ethereum platform 221, data blocks connected in a peer-to-peer network 224, Solidity 222, and smart contracts 223. Ethereum platform 221 allows stakeholders to program through smart contracts 223. Data in Ethereum platform 221 are stored on data blocks 224 that include transactions that change the state of the data. Ethereum platform 221 consists of two main components: an Ethereum virtual machine (EVM) and a peer-to-peer network 224. The Ethereum Virtual Machine (EVM) is a piece of software that can understand commands and execute commands in a logical sequence. When a software developer uses the Ethereum programming language to build smart contracts 223, the EVM compiles the source codes and turns them into a low-level machine language that the EVM can understand and execute. The peer-to-peer network 224 in Ethereum platform 221 consists of machines that connect through a decentralized and peer-to-peer network. Each machine in the network runs the Ethereum platform virtual machine (EVM) and executes the same commands to ensure that the machines reach consensus on all the transactions made in Ethereum platform 221. Ethereum platform 221 tracks the status of all accounts. All transactions on the Ethereum platform 221 transfer values and information between accounts. There are two types of accounts: (1) Externally Owned Accounts (EOAs) and (2) Contract accounts. EOAs are controlled with a private key. Ethereum platform 221 account key and account management can be managed by a centralized server, by cryptographic wallet software such as Metamask at the user's machine, by specialized hardware devices, or by paper depending on the level of security is applied. Contract accounts are controlled by commands of contracts, and this account can only be created by an externally owned account. The difference between these accounts is that EOAs are controlled by humans through private keys. The contract account is controlled by the command section in the contract account, and this part of the statement is called a smart contract. These smart contracts are executed according to the programmed logic only when a transaction calls to it. Ethereum platform 221 allows users to program through the creation of smart contracts 223. Blockchain ecosystem 170 and Ethereum platform 221 allow programming as any popular programming language such as Python, C++, and JavaScript. One of the programming languages supported by Ethereum platform 221 is Solidity 222.

Continuing with FIG. 2, in various aspects of the present invention, Blockchain ecosystem 170 satisfies the following requirements: (a) programmability, (b) dynamic list storage, (c) authentication and authorization, (d) highly resistant to data modification, (e) and highly available, popular, or open to the public. Bockchain ecosystem 170 supports smart contracts include Ethereum, Ripple, Qtum, Neo, Cardano, and Tezos in which Ethereum and Ripple are the two most popular platforms. Of the two platforms, Ethereum is the best platform due to (a) a public blockchain, (b) high resistance to change, and (c) high availability. The Ethereum platform is the second largest public blockchain platform today with a large number of participating nodes with about 1,821,101 nodes. The number of nodes in this network determines the change resistance and availability of the system.

Referring back to FIG. 1 and FIG. 2, system 100 achieves the following objectives:
 (1) Issuance of credentials in batch;
 (2) Students or holders of credentials can completely hide the attributes or components that they do not want the verifiers to see; and
 (3) Auditable Merkel tree that summarizes the total information from an issuers.

Next referring to FIG. 3, an issuer smart contract 300 generated by system 100 in accordance with an exemplary embodiment of the present invention is shown.

Issuer smart contract 300 is written in Solidity programming language. This programming language is a statistically-typed curly-braces designed for smart contracts that run on Ethereum platform 221. At a line 301 the compiler version for Solidity programming language is user ("pragma solidity >=0.7.0"). At a line 302 declares a state variable for an institute (issuer 110) that is "immutable" whose value is assigned at construction time and unchangeable. These immutable variables are copied to all the places in the code where they are accessed. For these values, 32 bytes are served. Similarly, at a line 303, Merkle Tree root variable is declared immutable and 32 bytes are reversed. At a line 304 and a line 305 the attributes (components) are declared to be non-negative integers of 256 bit that is immutable. If not specified the default values for these attribute variables are 32 bytes. At a line 306, these above variables are mapped into a string revocationList. A block 307 is a function to check the mandatory components of a credential. An issuer construction block 311 outlines the functions within smart contract 300. A revocation block 312 establishes the revocation list and reasons. A validation block 313 is designed to check the validity of the mandatory component of a certificate. A verify block (routine or subroutine) 314 verifies the root node of auditable Merkle tree, a process will be disclosed later. After smart contract 300 is written and formed, compiler in Ethereum Virtual Machine (EVN) compiles these high-level language codes into lower language bytecodes so as to perform these functions 311-314. After smart contract 300 is submitted to blockchain ecosystem 170, a receipt is issued.

Figure 4:
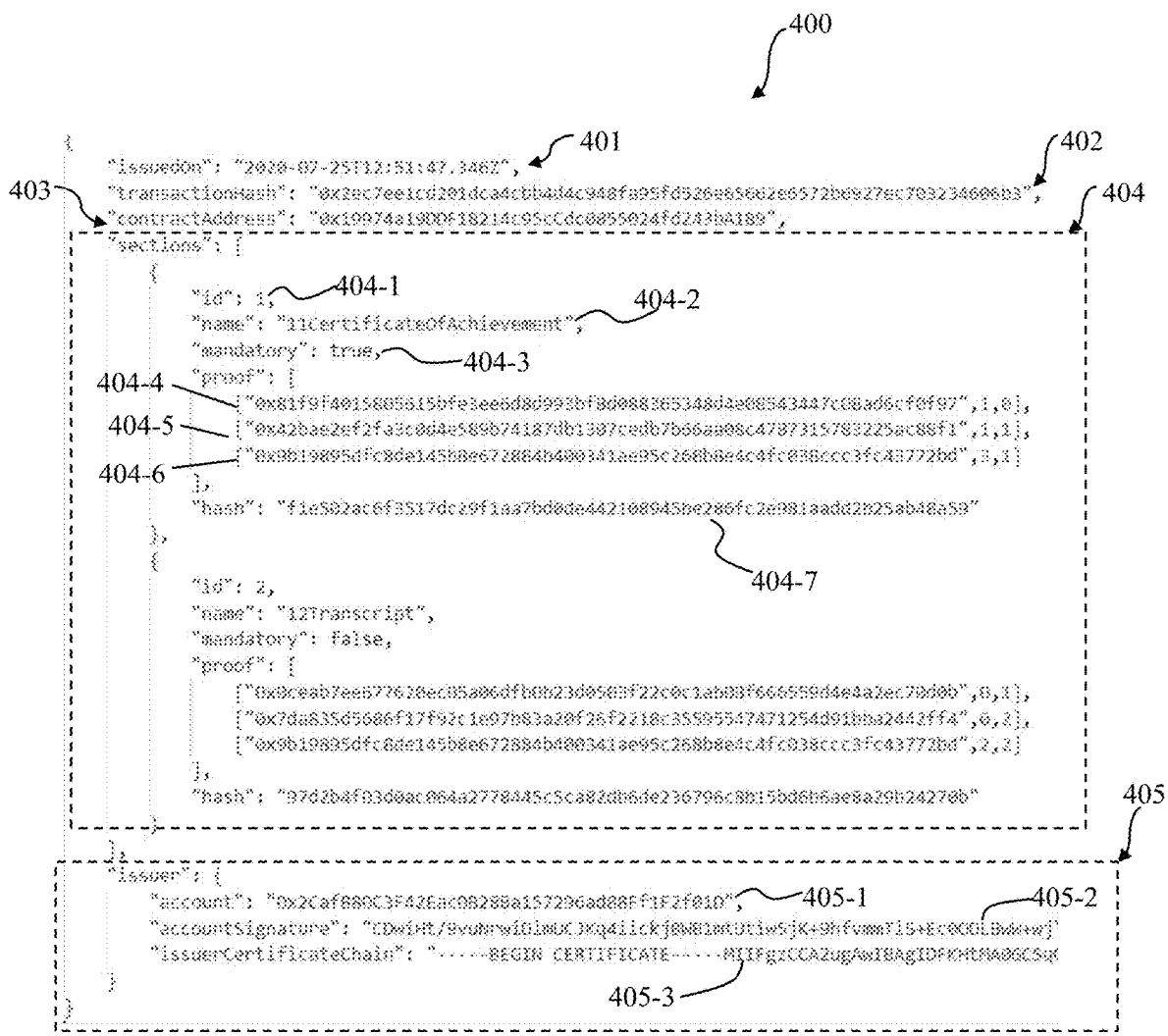
FIG. 4 shows the Solidity codes of the issuer receipt issued when creating a digital credential and a smart contract in accordance with an exemplary embodiment of the present invention.

Referring to FIG. 4, an issuer receipt 400 generated after the smart contract being published to blockchain ecosystem 170 in accordance with an exemplary aspect of the present invention is illustrated. At a line 401, the time stamp of the transaction is indicated. At a line 402, the transaction Hash value is listed. After publishing credentials to Ethereum platform 221, system 100 generates issuer receipt 400 for each credential and sends it along with the digital credential to the corresponding holder 120 (students). Verifier 130 (relying party) uses issuer receipt 400 to verify and validate the credential. Issuer receipt 400 contains metadata of smart contract 300 which includes a proof of existence in an auditable Merkle tree 600 for each component of credentials 140-1, 140-3, to 140-9 (e.g., 140-3), and the certificate of issuer 110. The metadata in issuer receipt 400 are designed to help verifier 130 to verify the identity of issuer 110 and the validity of certificate 140-3. The metadata in receipt 400 consists of a time stamp 401, transaction Hash value 402, contract address line 403, of the transaction that deployed smart contract 300 and the identity of the issuer 110. In some aspects of the present invention, a verifiable identity block 405 is a hybrid approach [6] that uses binding between accounts in Ethereum platform 221 and a public key certificate of issuer 110. The certificate (e.g., 140-3) is issued by a trusted certificate authority (CA) of the public key infrastructure (PKI) 160. As alluded above, PKI 160 further comprises hardware and software for creating, managing, distributing, using and revoking public keys. At registration time, the CA verifies the identity of issuer 110 and writes its information into a digital certificate X. 509. Then, CA digitally signs certificate X. 509 with its private key [1]. Therefore, originality of digital certificates X. 509 in system 100 is guaranteed. Before using UI-certification 150, issuer 110 endorses Ethereum platform 221 used to publish certificates 140-1 to 140-9 (e.g., 140-3) by signing the respective address with the private key of the X.509 certificate. Then, issuer 110 inputs to system 100 the address of its Ethereum account, the signature, and its X.509 certificate chain. Later, verifier 130 (replying parties like employers) can retrieve from receipt 400 the information to verify them versus their trusted certificate authority (issuer 110), thereby authenticating the identity of the issuer 110 and the validity of the smart contract 300.

In receipt 400, the proof of existence of a component is carried out by component block 404 which contains Hash values extracted from auditable Merkle tree built in the issuing phase. Component block 404 contains an "id" line 404-1 which counts the number of components. A "name" line 404-2 which lists the title of the component. In this non-limiting example, the title of the first component is "CertificateOf Achievement". Since each component corresponds to a leaf node of the tree, its proof of existence is a list of nodes in the Merkle tree requires recalculating the path from the corresponding leaf node to the root node [13]. In an example in FIG. 4, the proof of existence of component 303-304 is the hash value of CertificateOf Achievement and the hash value of Transcript. From these proofs, the path from components 303-304 to the root node. At a line 404-3 is the type whether this component is a mandatory "mandatory=true" or optional "mandatory=false" (see "Transcript" component). Next, a line 404-4 is a Hash value of the adjacent component. A line 404-5 is the Hash value of the leaf node next to its parent leaf node. A line 404-6 is the Hash value of the root node. A line 404-7 is the Hash value of component (Certificate of Achievement) to be verified. With these known Hash values, the existence of the component to be verified by recalculating the paths leading to Hash value of root node 404-6. If Hash{Has(j+1)+Hash[Hash(i)+Hash (i+1)]}=Hash(Root), then certificate is verified. Otherwise, either the certificate has been tempered with, thus its Hash value is changed and/or this certificate is not sent by issuer 110.

Next, in issuerID block 405 includes an account number Hash value 405-1, an account signature Hash value 405-2, and certificate chain Hash value 405-3 of issuer 110. Account 405-1 is the public key which is issued by PKI 160. Account signature 405-2 is the digital certificate X-509 equivalent to the passport of issuer 110. Like a passport, it contains all private information of issuer 110. The certificate authority (CA) provides a public key, a digital certificate X-509, and a private key to a user when the user registers in PKI 160.

Next referring to FIG. 5A-FIG. 5B, in FIG. 5A a issuer receipt 500A in which holder 120 chooses to show his or her component 511 (i.e., ScienceProfile) and FIG. 5B shows a receipt 500B in which component 511 (i.e., ScienceProfile) is made invisible to verifier 130. In one aspect of the present invention, holder 120 selects block 511 to delete. In some other aspects of the present invention, block 511 is hidden by using V-GUI 170-2 (or front end 900) in which holder 120 selects the optional components to disclose by not selecting the other components. Please refer to FIG. 9. Thus, an objective of the present invention is achieved by allowing issuer 110 to delete components that s/he does not want verifier 130 to review.

Figure 6:
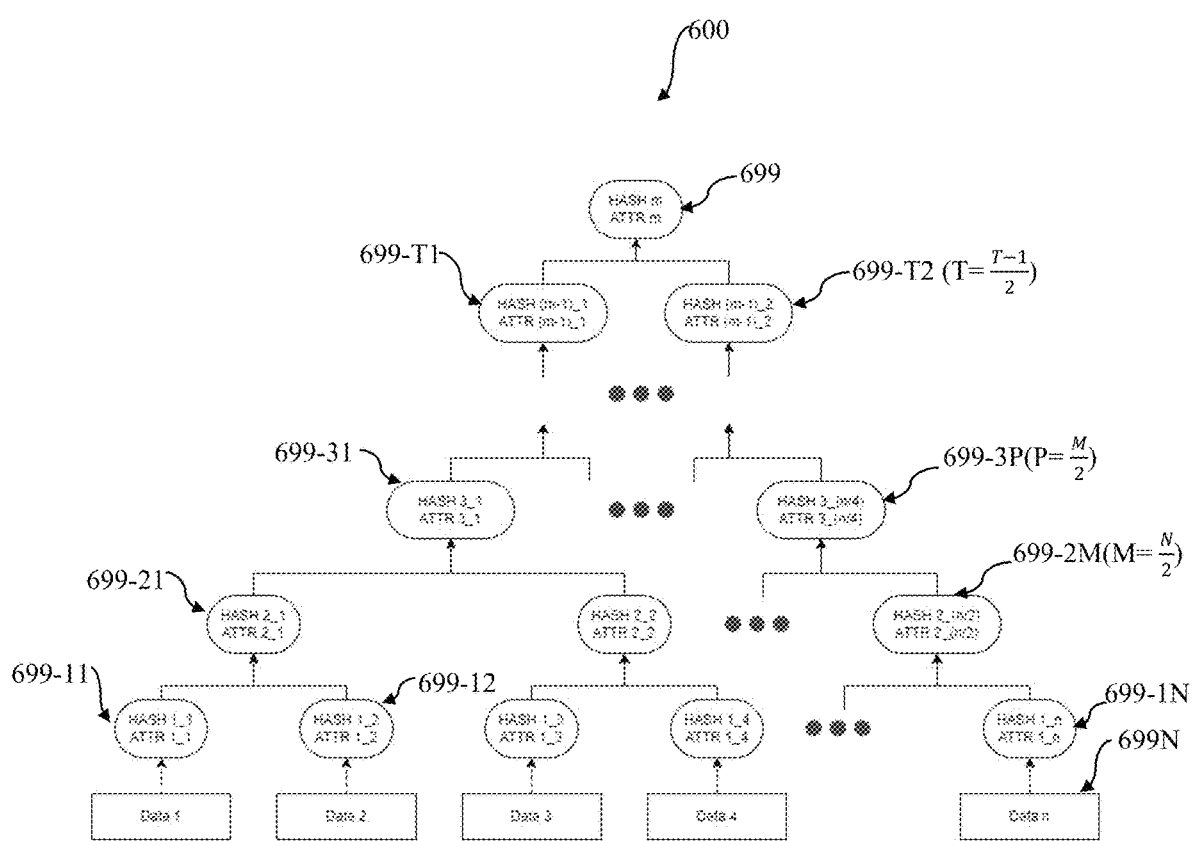
FIG. 6 shows an auditable Merkle tree in accordance with an aspect of the present invention.

Now referring to FIG. 6, a diagram of an auditable Merkle tree 600 in accordance with an aspect of the present invention is illustrated. In some aspects of the present invention, the schema and the digital fingerprint of each credential in contract 300 are used to construct auditable Merkle tree 600 [13]. First, the identity of the credential with the contents of the components Data 1, Data 2, to Data N and its type are combined in a binary fashion. Mandatory component 699-11 such as Transcript or optional components 699-12 such as Science profile are defined by the schema. Then SHA-256 calculates the Hash value of the combination and create a leaf node 699-11. Attributes Attr1-1 are also extracted and combined. This procedure is applied to all components Data 1, Data 2, to Data N of all input credentials and obtain corresponding leaf nodes up to 699-1T. Next, the Hash value and the attributes at leaf nodes 699-11 to 699-1N are concatenated in binary fashion. That is, two adjacent leaf nodes 699-11 and 699-12 are concatenated and a new Hash value is calculated to create a parent node 699-21. Their attributes are also extracted and combined. This procedure is continued upward to a root node 699. It is noted that auditable Merkle tree 600 from any arbitrary number of credentials and always results in a single root node 699. Issuer 110 or institution could issue credentials in batch to save time and effort.

$$\mathrm{Hash}_{ij}^{M} = \mathrm{Hash}\!\left(\mathrm{Hash}_{i-1,j-1}^{M-1}, \mathrm{Hash}_{i,j}^{M-1}\right)$$

$$\mathit{Attr}_{ij}^{M} = \mathrm{Combine}\!\left(\mathit{Attr}_{i-1,j-1}^{M-1}, \mathit{Attr}_{i,j}^{M-1}\right)$$

i, j are integers indicating the order of a binary pair of components or attributes within a row, M is the order of the parent leaf node directly above that i, j binary pair. M at the root node equals to $\log_2 N$. N is the total number of components, data, or attributes. If N is an odd integer, then the last unpaired data will pair to itself.

Figure 7:
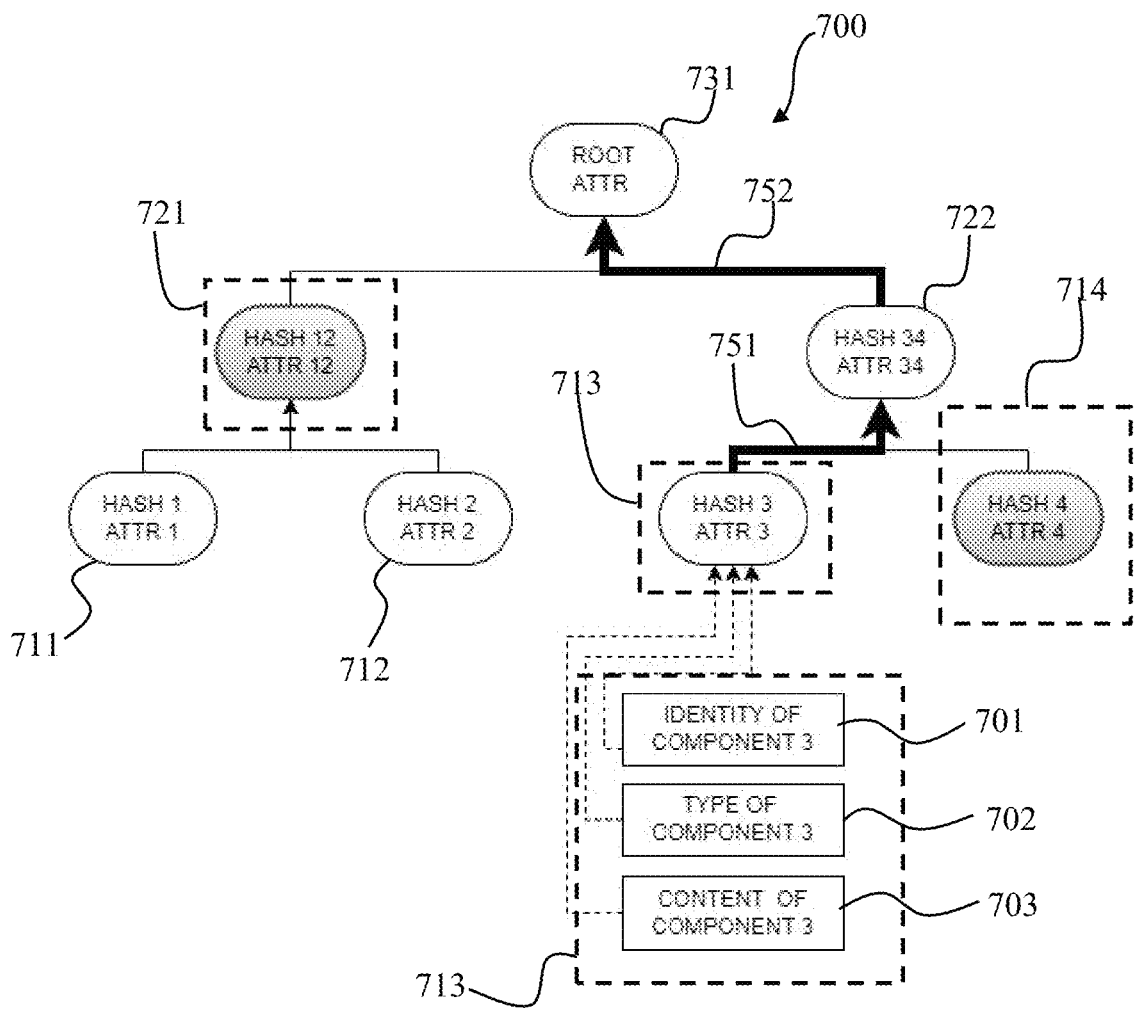
FIG. 7 shows a section of auditable Merkle tree that proves the validity of a component by deriving the Hash value of the root node in accordance with an aspect of the present invention.

Referring to FIG. 7, a section 700 of an auditable Merkle tree proving the existence of a component is illustrated. Section 700 includes a Hash1 with attribute 1 711, a Hash 2 with attributes 2 712, a Hash 3 with attributes 713 and a Hash 4 with attributes 714. Each attribute such as attribute 3 contains an identity of component 701, type of component 702, and content of component 703. According to the binary concatenation procedure described above, hash 1 711 and hash 2 712 are concatenated to form a leaf node 721. Hash 3 713 and Hash 4 714 are concatenated to form a leaf node 722. Leaf node 721 and leaf node 722 are again concatenated to form root node and attributes 731. Each leaf node such as leaf node 722 includes address and transaction hash values of contract 300, receipt 400, components, and hash values for previous leaf nodes 713. Since Merkle tree 700 is used in blockchain ecosystem 170, the proof of existence of component at leaf node 713 is hash value of Hash 12 712 and Hash value 4 714. From these proofs, a path 751 and a path 752 from leaf node 713 are calculated to rot node 713. That is, if Hash{Has(j+1)+Hash[Hash(i)+Hash (i+1)]}=Hash (Root), then certificate is verified. Otherwise, either the certificate has been tempered with, thus its Hash value is changed and/or this certificate is not sent by issuer 110.

Figure 8:
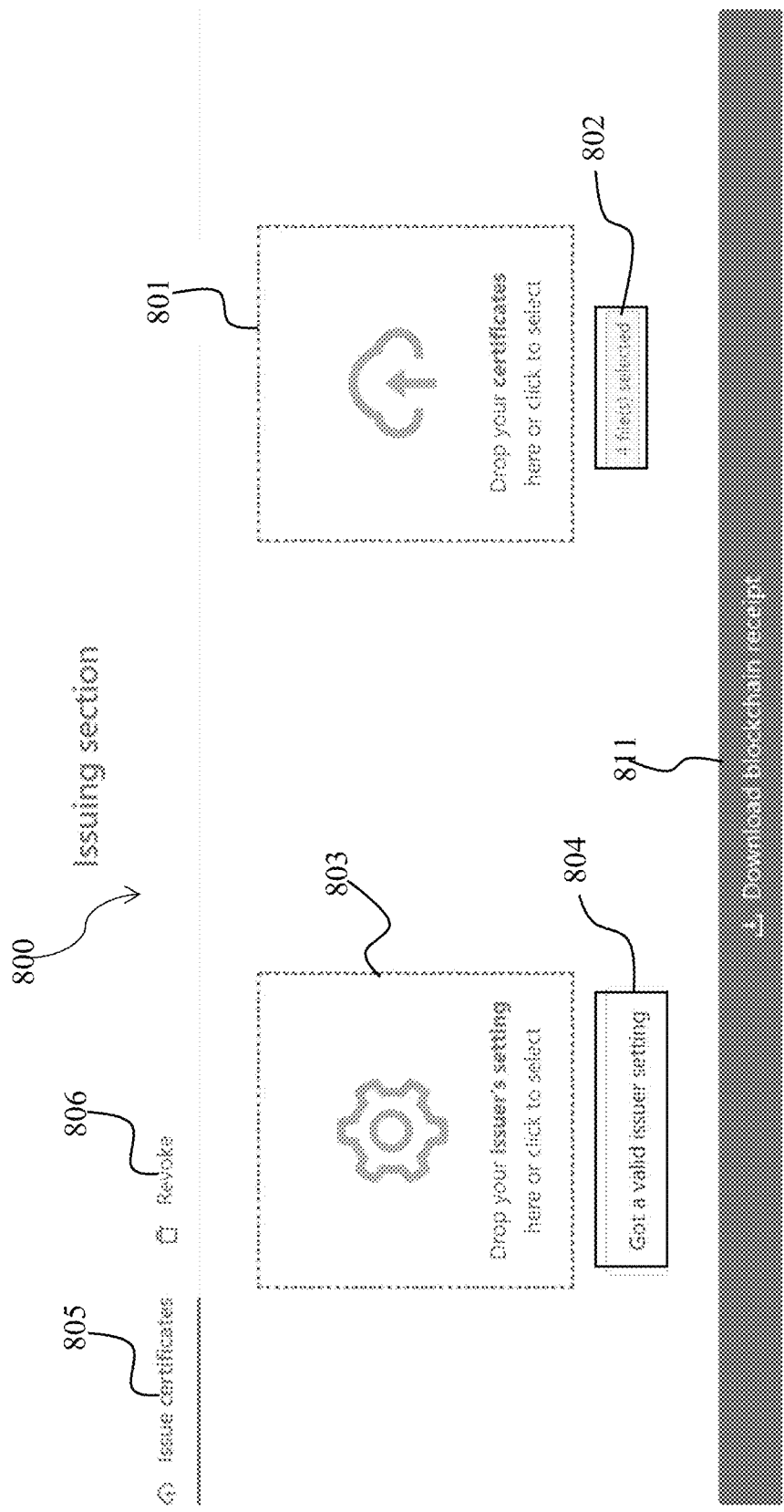
FIG. 8 shows an issuer application front end (GUI or browser page) that assists users to issue credentials with options to choose among optional components in accordance with an aspect of the present invention.

Next, referring to FIG. 8, an issuer graphic user interface (GUI) application front-end 800 in accordance with an exemplary aspect of the present invention is illustrated. After issuer 110 logs in to system 100 using Remote Procedure Call (RPC) protocol of the Web3.js, application font-end or browser page 800 is displayed. Issuer GUI 800 is in the user layer and includes a certificate browser 801, a certificate indicator box 802, a component setting box 803, a component setting status box 804, a certificate issue box 805, a revocation box 806, and a blockchain receipt download box 811. Certificate browser 801 allows issuer 110 to select which components 141M, 141O1-141O2 (Transcript or ScienceProfile) to issue. Certificate indicator box 802 displays the number of components selected. Component setting box 803 allows issuer 110 to choose which components are mandatory and which components are optional (i.e., make invisible). In this case, line 404-3 "mandatory" is set to true for being mandatory. Otherwise, "mandatory is set to false. Thereupon, setting checkbox 804 indicates whether the setting is valid. Afterwards, if the schema in the selection is valid, issuer 110 selects to issue certificate by pressing certificate issue box 805. Revocation box 806 allows issuer 110 to revoke a certificate. Afterward, issuer receipt 111 is generated by pressing blockchain receipt download box 811. Issuer receipt 111 (or 300) is then publicly available to blockchain ecosystem 170.

Figure 9:
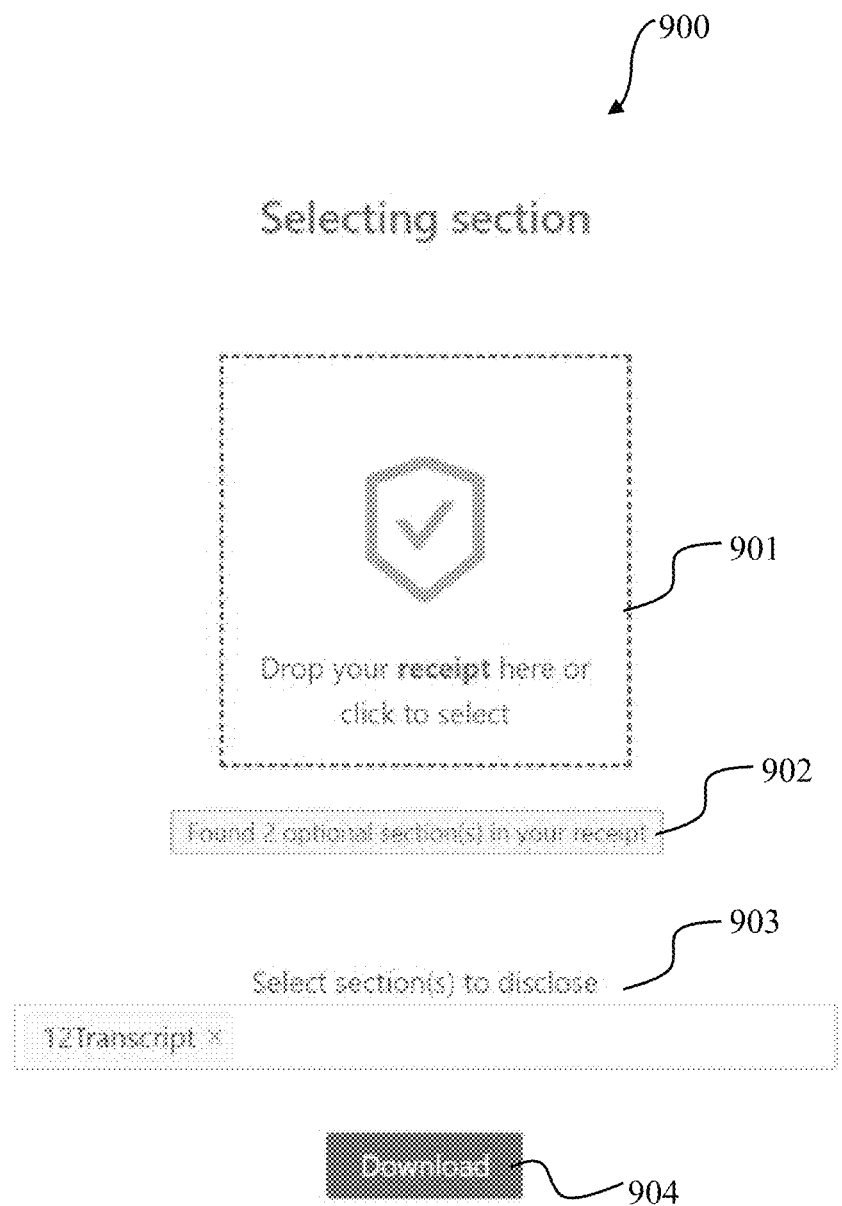
FIG. 9 shows a holder application front-end graphic (GUI or browser) that assists the holder to select the optional components to be disclosed/hidden in accordance with an aspect of the present invention.

In FIG. 9, a holder application front-end 900 in accordance with an exemplary aspect of the present invention is illustrated. Issuer application front end 800 and Holder application front-end 900 are in the user layer. Holder application front end (H-GUI 171-3) 900 includes a receipt browser box 901, a receipt information box 902, a component selection box 903 and a download box 904. After holder 120 logs in to blockchain ecosystem 170 using private key and public key as shown in block 405, holder 120 receives issuer receipt 400. Issuer 120 drags and drops issuer receipt 400 into receipt browser box 901. Receipt information box 902 shows a total optional components. Then issuer 110 selects which optional components to hide and which one to show. For example, issuer 110 may select Transcript to disclose and hide (make invisible) ScienceProfile. Then holder 120 clicks download box 904 to send his/her selection.

Figure 10A:
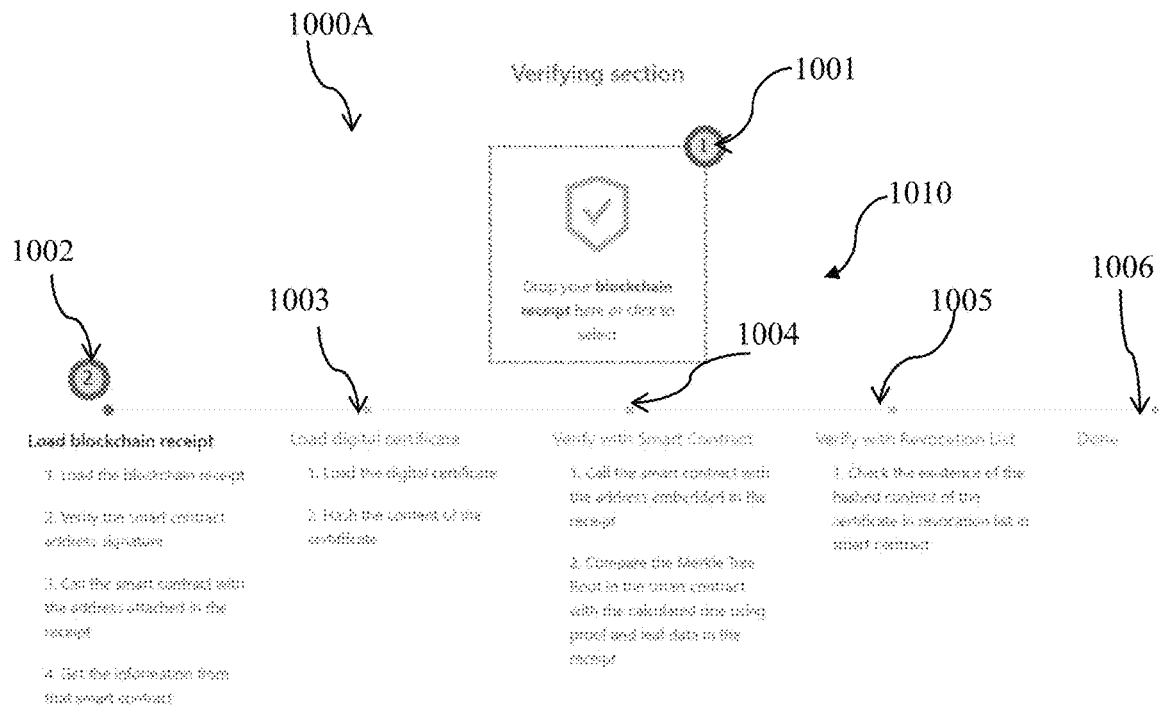
FIG. 10A-FIG. 10B show a verifier application front-end Graphic Interface (GUI or browser) to assist the verifier to verify a credential issued in accordance with an aspect of the present invention.
Figure 10B:
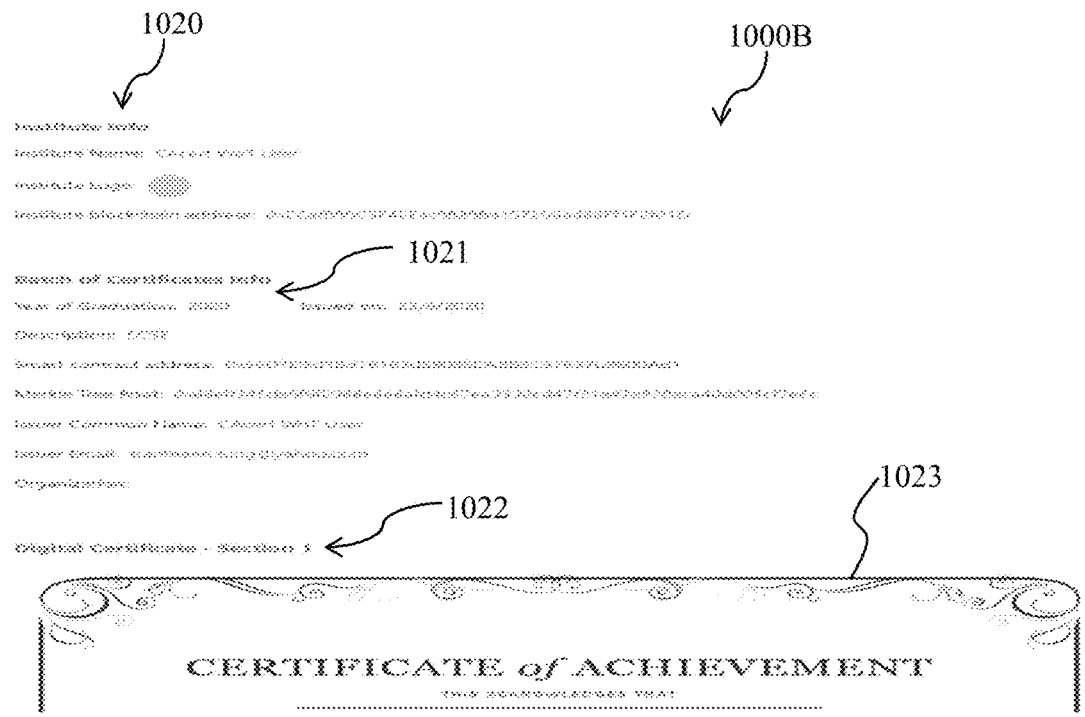

Next referring to FIG. 10A-FIG. 10B, a verifier application front-end (GUI, browser) 1000A in accordance with an exemplary aspect of the present invention is illustrated. Again verifier GUI 1000A is in the user layer while Ethereum platform 221 and blockchain ecosystem 170 are in the application layer. Verifier GUI 1000A includes a dropbox 1001 to load issuer receipt 400. Verifier 130 can verify a credential issued by IUcertification unit 150 from the files, smart contract 300 and the blockchain ecosystem 170 without contacting issuer 110. The credential verifying process includes the following steps: 1. Checking the receipt 400 information and the issuer's information from lines 401-403, the signature of the Ethereum account used to issue the credential at line 405-2, the validity of the owner of the smart contract 300 on Ethereum platform 221.—The name of the issuer in smart contract 300 and the name on the X.509 certificate. 2. Checking the integrity of all components of the credential. This step checks the number, the type and the hash value of the files against the value stored on the receipt. 3. Checking the validity of the components in the certificate. This step checks the hash value and proofs to confirm whether the credential belongs to Merkle tree 600 whose root node 699 is published on blockchain ecosystem 150. Checking whether the certificate is revoked. This step checks if the mandatory component of the credential in the list of revoked credentials stored in the smart contract 300 on blockchain ecosystem 170.

Continuing with FIG. 10B, the above procedure is implemented in verifier certification unit 152 with an automatic progress bar 1010 to guide verifier 130 in each step as shown in FIG. 10A. In other aspects of the present invention, verifier 130 performs the verifying procedure manually on their own. Once received a digital credential and holder receipt 500B, a verifier 130 extracts all the data to verify a credential without involving issuer 110. Then with a connection to blockchain ecosystem 170 and any publicly available tools to verify a digital signature and a X.509 certificate, verifier 130 can finish the verification procedure. That helps us fulfill objectives of (2) verify and validate a credential, and (5) the ability to independently check the integrity and validity of credential.

Next, FIG. 10B, a display 1000B of verifier GUI 1000A is shown. Display 1000B includes an institution information section 1020 (issuer 110), a batch of certification information box 1021, and a component presentation display 1022. Institute information section 1010 is a mandatory component in component block 404 that holder 120 has selected. Batch of certification information box 1021 shows the information in root node 699 of auditable Merkle tree 600. In the present invention, auditable Merkle tree 600 uses various extracting and combining functions such as addition to add up the attributes from leaf nodes. Verifier 130 may only review section 1021 to verify the credibility of holder 120.

Figure 11:
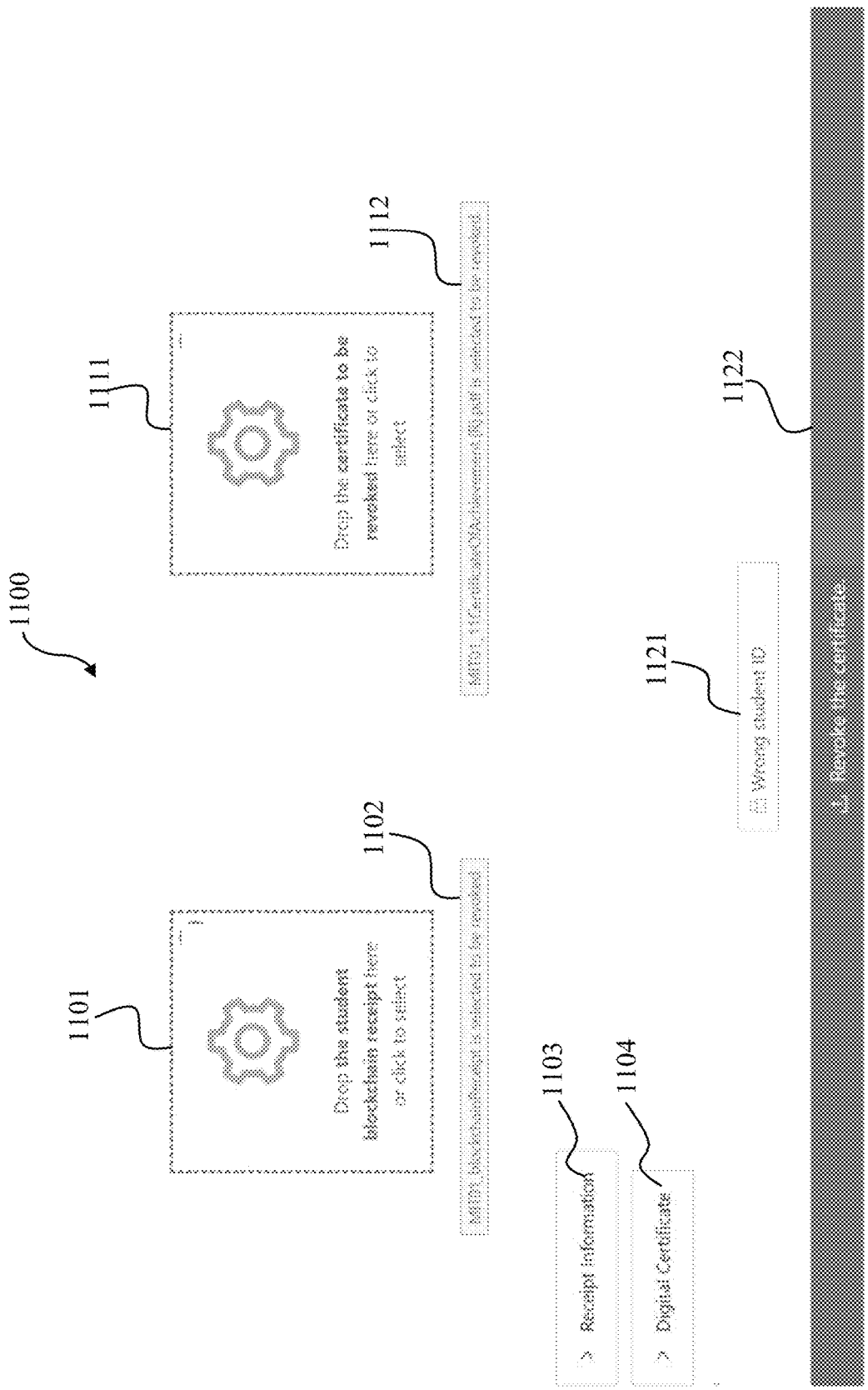
FIG. 11 shows another GUI display of the verifier application front end (GUI or browser) that assists the verifier to revoke a credential issued in accordance with an aspect of the present invention.

Next referring to FIG. 11, a revocation application front end (GUI or browser) 1100 in accordance with an exemplary aspect of the present invention is shown. Revocation page 1100 is also in the user layer and includes a student blockchain receipt box 1101, a receipt data box 1102, a receipt information display box 1103, a digital certificate display box 1104, a certificate dropbox 1111, a certificate data box 1112, a revocation reason box 1121, and a revocation activation button 1122. In revocation operation, verifier 130 drops a student blockchain receipt box 1101. Immediately, receipt selection indicator box 1102 displays which blockchain receipt is being revoked. Verifier 130 clicks receipt information 1103 to review all information contained in student receipt 500B. Similarly, all information on digital certificate can be displayed when verifier 130 selects this box. Issuer 130 drops the component or attributes such as CertificateOfAchievement into certificate dropbox 1111. The title of the certificate being revoked is shown in revocation activation button 1112. Revocation reason box 1121 displays the reason for revocation such as wrong student ID. After all this, verifier 130 clicks revocation activation button 1122 to revoke this particular certificate.

Next referring to FIG. 12-FIG. 16, methods for performing issuing, selecting, verifying, and revoking described above are disclosed. These methods are non-transitory computer programming codes provided by Solidity of Ethereum platform 171 and Ethereum Virtual Machine (EVM). Remix is website that provides Solidity programming for system 100 that are outlined by the following methods.

Figure 12:
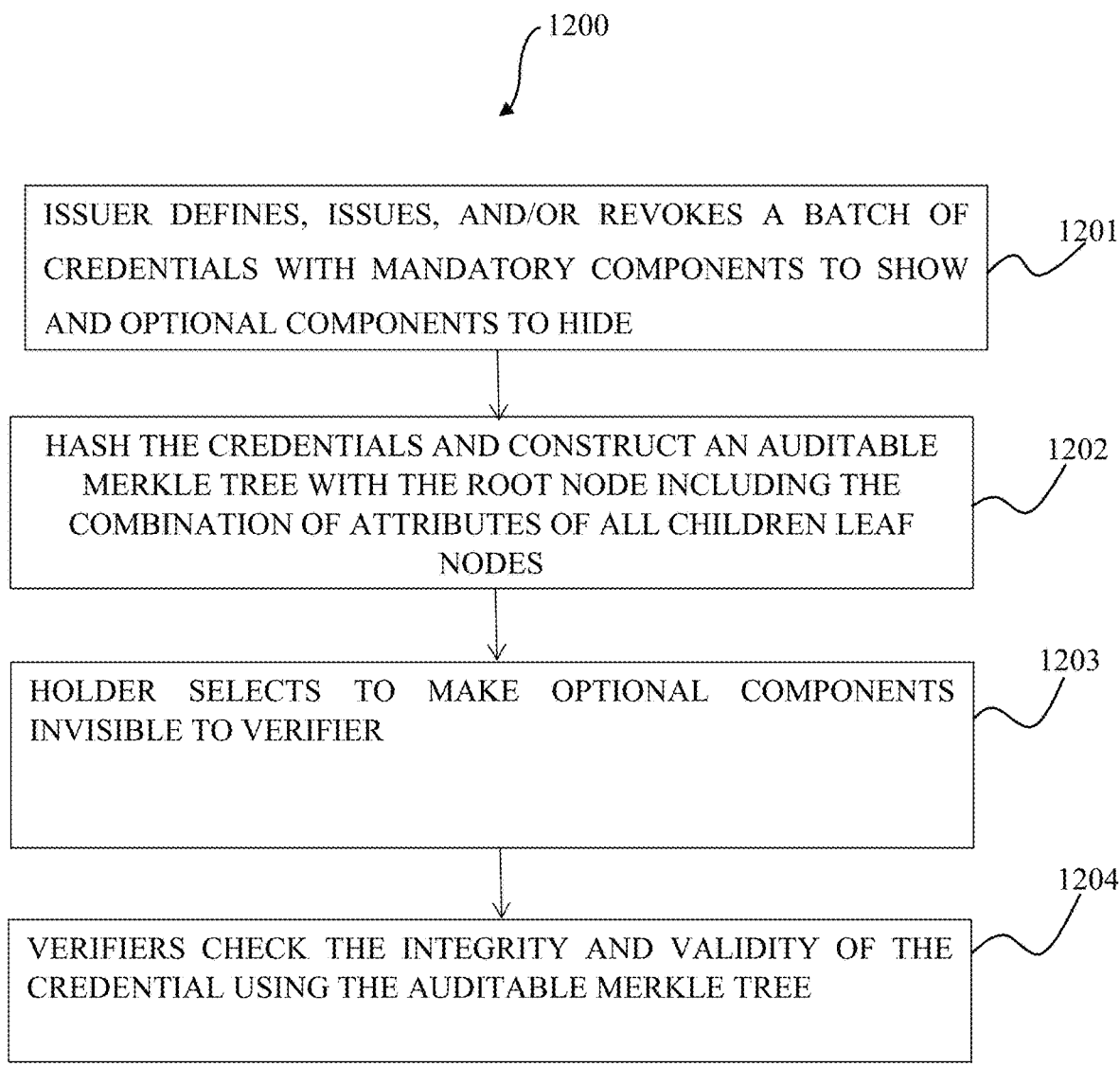
FIG. 12 shows a method for performing the option selective disclosure/hiding, auditable Merkle tree, and revocation and reason steps in a system in accordance with an exemplary embodiment of the present invention.

Now referring to FIG. 12, a method 1200 for issuing, verifying, and revoking credentials using blockchain and auditable Merkle tree in accordance with an exemplary aspect of the present invention is illustrated. Method 1200 is programmed on the infrastructure of system 100 described above and performs the following main steps (1) defining, issuing, and/or revoking a batch of credentials with mandatory components to how and optional components to hide; (2) Hashing the credentials and constructing an auditable Merkle (Hash) tree with each node including an extract and combine function of the corresponding children nodes; (3) selecting to make components invisible to the verifier, and (4) verying and checking the integrity and validity of each credential using the revocation list and smart contract.

At step 1201, a batch of credentials are selected and their respective schema of mandatory and optional components are defined. Step 1201 does not end here. After defining the schema, defined certificates can be revoked due to errors or updating purpose. Step 1201 is realized by system 100. More particularly, step 1201 is realized by issuer certification unit 153, blockchain ecosystem 170, and PKI 160. Blockchain ecosystem 170 via Ethereum platform 221 generates smart contract 300. In line 301, the compiler version for Solidity programming language is used ("pragma solidity >=0.7.0"). At line 302 declares a state variable for an institute (issuer 110) that is "immutable" whose value is assigned at construction time and unchangeable. These immutable variables are copied to all the places in the code where they are accessed. For these values, 32 bytes are served. Similarly, at line 303, Merkle Tree root variable is declared immutable and 32 bytes are reversed. At line 304 and line 305, the attributes (components) are declared to be non-negative integers of 256 bit that is immutable. If not specified the default values for these attribute variables are 32 bytes. At line 306, these above variables are mapped into a string revocationList. Block 307 is a function to check the mandatory components of a credential. Issuer construction block 311 outlines the functions within smart contract 300. Revocation block 312 establishes the revocation list and reasons. Validation block 313 is designed to check the validity of the mandatory component of a certificate. Verify block (routine or subroutine) 314 verifies the root node of auditable Merkle tree, a process will be disclosed later. After smart contract 300 is written and formed, compiler in Ethereum Virtual Machine (EVN) compiles these high-level language codes into lower language bytecodes so as to perform these functions 311-314. After smart contract 300 is submitted to blockchain ecosystem 170, a receipt is issued.

At step 1202, the defined certificates are posted and hashed, the receipts, and an auditable Merkle tree are generated and sent to the stakeholders. Step 1202 is made possible by the programming language built in of Solidity 222 and Ethereum platform 221. Auditable Merkle tree 600 with hashing values, extracting and combining function at each leaf node and root node 699 is formed. The formation of auditable Merkle tree 600 is disclosed in details in FIG. 14. It is noted that different extracting and combining functions can be readily used depending on each application. For example, various extracting and combining functions can be used in other domains such as real estate, logistics, etc.

At step 1203, optional components specified in the smart contract are selected and made invisible to the verifiers. Step 1203 is realized by Ethereum platform 221 and Solidity 222 via user GUI (front end or browser) 171. After downloading smart contract 300, holder 120 may select an optional component such as 143O1 (ScienceProfile) to delete. In one aspect of the present invention, verifier 130 may use browser page 900 and steps disclosed in FIG. 9 above. If holder 120 selects "Transcript" to disclose at box 903, the other optional component 143O1 is not selected and thus invisible. As a consequence, optional component 143O1 is not visible to verifier 130. Alternatively, holder 120 my use independent method to select optional components. Referring back to FIG. 5A and FIG. 5B, step 1203 is illustrated by holder 120 deleting block 511 to hide his or her ScienceProfile from verifier 130.

At step 1204, the credential is verified. At verifier GUI (front end) 171-3, verifier 130 carries out four steps to verify a certificate 140-1, 140-3 to 140-N. First, verifier 130 load blockchain receipt 400 to get information from smart contract 300. With contract address 403 and transaction Hash 402 and information from block 404, verifier 130 uses the Hash values of the adjacent transaction (i.e., 714) and transaction 721 to derive the Hash value of root node 731. More particularly, with Hash value of the transaction to be verified 713 and that of the adjacent transaction 714, verifier 130 can find the Hash value of transaction 722. With Hash value of transaction 722 and that of transaction 721, the Hash value of root node 731 can be readily verified. In various aspects of the present invention, verifier 130 uses auditable Merkle tree 600 to audit the attributes at root node 699. In a non-limiting example, if root node 699 shows that there is no Bachelor of Science (BS) in Mechanical Engineering (BSME), and holder 120 claims that he or she has earned a BSME, then the claim of holder 120 is fraudulent.

Figure 13:
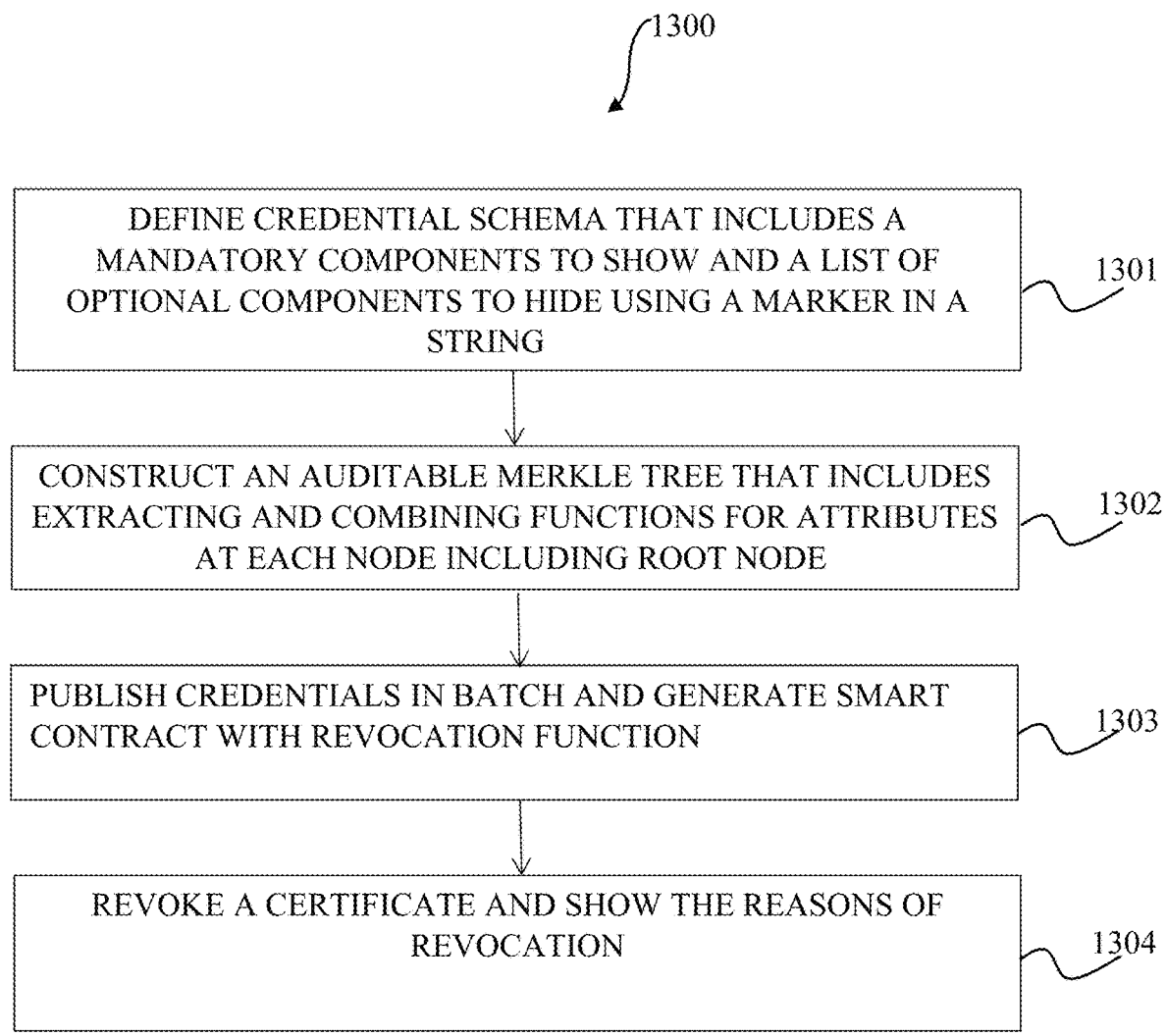
FIG. 13 shows a method for verifying a credential issued in accordance with an exemplary embodiment of the present invention.

Next, referring to FIG. 13, a method 1300 of issuing a certificate by issuers in accordance with an exemplary aspect of the present invention is illustrated. Method 1300 is programmed by Solidity programming language that performs the steps of smart contract 300 prepared by issuer 110.

At step 1301, a credential schema that includes mandatory components and optional components of a certificate is defined. In many aspects of the present invention, optional components are hidden from view of verifiers 130. Certificates 140-1 to 140-N each includes mandatory components 141M and optional components 141O1-141O2. This is accomplished by issuer 110 preparing and deploying smart contract 300. Specifically, constructor block 306, issuer 110 (_institute), auditable Merkle tree root (_MTRoot), and components (_Attribute1, and _Attribute2) are declared.

At step 1302, an auditable Merkle tree is constructed that includes extracting and combining functions at each node. This is accomplished by deleting optional component block 511 which is ScienceProfile. FIG. 5B shows receipt 500B viewed by verifier 130. While receipt 500A shows the version viewed by holder 120 before selecting which optional components to hide. In step 1302, the following iterative steps are performed:

$$\text{Hash}_i^j = \text{Hash}(\text{Hash}_{i-1,j-1}^{j-1}, \text{Hash}_i^{j-1})$$

$$Attr_i^j = \text{Combine}(Attr_{i-1}^{j-1}, Attr_i^{j-1}),$$

where i is the number of N data or data, transactions, or components in a block. M is the number of vertical row levels from first level to the root node, M=log 2N.

At step 1303, credentials (attributes, components, data) are published in batch. Step 1303 is realized by smart contract 300. More particularly, constructor block 306, a batch of credentials including attribute1, attribute2, to attributeN can be issue by this programming code AttributeN=_AttributeN in Solidity. In addition, revocation function is enabled by revocation block (subroutine) 309. "String memory reason" is enabled stakeholders such as verifiers 130 to see the reason for revocation.

At step 1304, a certificate is programmed to be revoked by the issuers and the reasons for revocation is displayed. Step 1304 is realized by smart contract 300 which is brought possible by system 100 and Solidity programming. More specifically, step 1304 is performed by revoke block 309. Please refer back to the discussion of FIG. 3 for more details.

Figure 14:
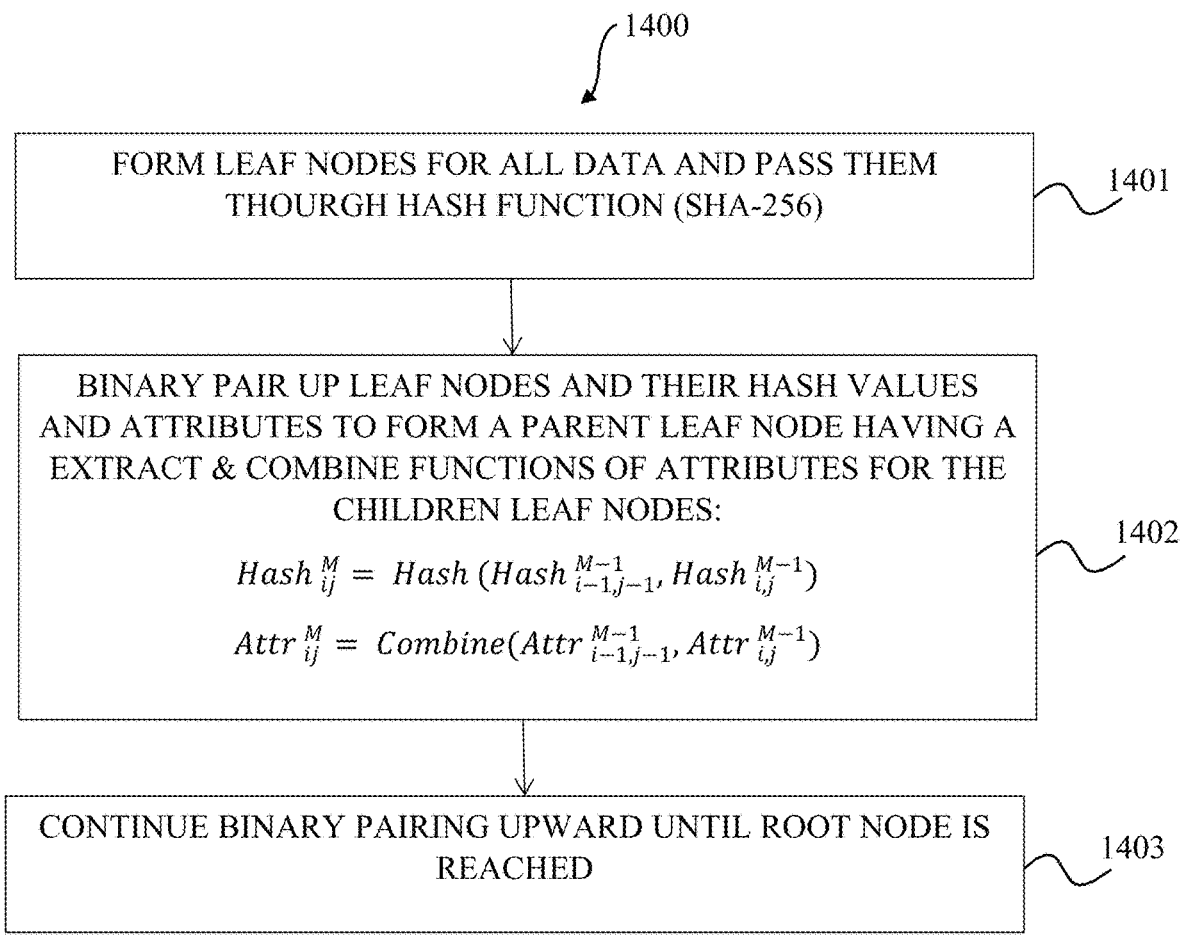
FIG. 14 shows a method for issuing credentials in batch with the optional components to be disclosed/hidden in accordance with an exemplary embodiment of the present invention.

Next referring to FIG. 14, a method 1400 for forming an auditable Merkle tree in accordance with an exemplary aspect of the present invention is illustrated. Method 1400 forms auditable Merkle tree 600 in FIG. 6 and a section 700 in FIG. 7. It is noted again that auditable Merkle tree 600 includes extracting and combining function at very leaf node including root node 699. This way, verifier 130 can audit the validity of a certificate by looking at the attributes in root node 699.

At step 1401, all transactions (data, components, or attributes) are paired up. This is called binary Merkle tree. Each transaction is Hashed using the Hash standard SHA-256. Step 1401 is realized by Data1, Data2, to DataN at first level 699N.

At step 1402, two adjacent transactions are combined to form a higher level leaf node. These adjacent leaf nodes are paired up and Hashed to form a higher level leaf nodes 699-11, 699-12, to 699-1N. Within each leaf node 699-11 to 699-1N, Hash values Hash1-1 and Attr1_1 are stored. See FIG. 6. Next, two adjacent (neighboring) leaf nodes 699-11 and 699-12 are paired up to form the next level leaf nodes 699-21 to 699-2M, where M=N/2. Each leaf node 699-21 to 699-2M contains Hash value Hash2-1 and Attr2-1. Then, leaf nodes in level M are paired up to form P level leaf nodes 699-31 to 699-3P where P=M/2=N/4. Each leaf node 699-31 to 699-3P contains Hash values Hash3-1 and Attr3-1 of its children leaf node. Next, leaf nodes 699-31 to 699-3P are paired up to form the next level leaf nodes 699-T1 to 699-T2 where T is half of the level right below it. Each leaf node 699-T1 to 699-T2 contain the Hash values HashT-1, AttT-1 and HashT-2, AttT-2.

At step 1403, following the above pattern, it is seen that the number of transactions of the level right above any level equals only half. Continuing, leaf nodes 699-T1 to 699-T2 are combined to form root node 699 which contains the Hash values and attributes of all leaf nodes. The number of levels equal to $\log_2 N$, where N is positive integers. Steps 1401 to 1403 can be expressed by the following iterative equations:

$$\text{Hash}_i^j = \text{Hash}(\text{Hash}_{i-1,j-1}^{j-1}, \text{Hash}_i^{j-1})$$

$$\text{Attr}_i^j = \text{Combine}(\text{Attr}_{i-1}^{j-1}, \text{Attr}_i^{j-1}),$$

where i is the number of N data or data, transactions, or components in a block. M is the number of vertical row levels from first level to the root node, M=log 2N.

Figure 15:
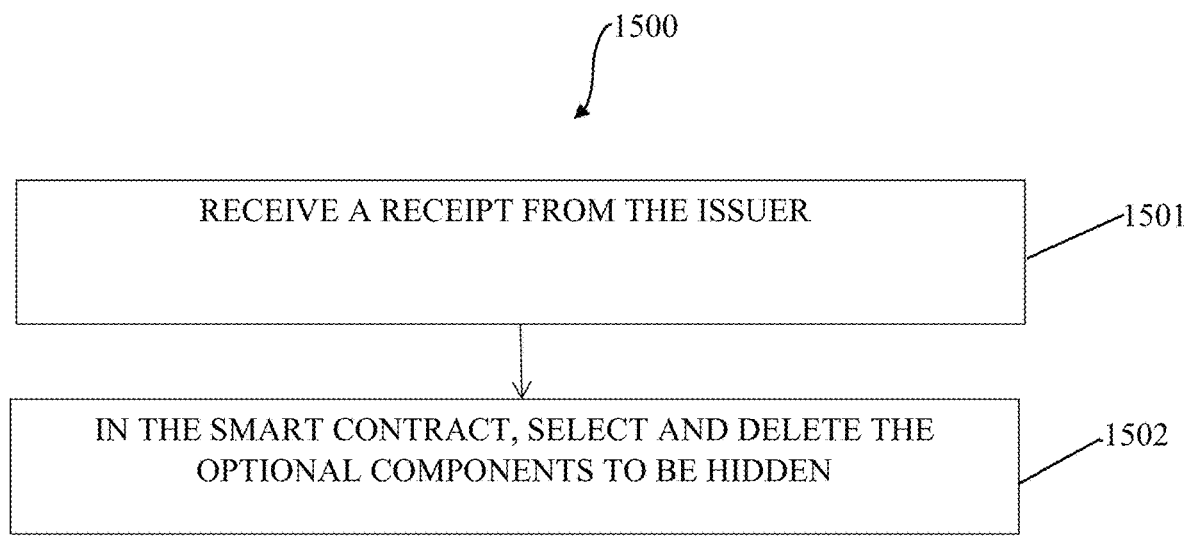
FIG. 15 shows a method for selecting an optional component of a certificate in accordance with an exemplary embodiment of the present invention.

Next referring to FIG. 15, a method 1500 for a holder to select optional components in accordance with an exemplary aspect of the present invention is illustrated. In the present invention, optional components are invisible to verifier 130. That is, verifier 130 does not even know the optional components exist.

At step 1501, a receipt is received. Step 1501 is made possible by front-end 170-2 which is shown in FIG. 9. The JSON web token (TWT) allows holder 120 to receive smart contract 300 and receipt 400 in various formats such as Word, pdf, text file. Holder 120 either drop receipt 400 into receipt browser box 901 or click on select box to choose receipt 400. Receipt information box 902 shows the number of optional components.

Next at step 1502, optional components are selected to disclose and unselected optional components are automatically hidden to the verifiers. At component selection box 903, holder 120 may select an optional component to disclose such as Transcript. The unselected optional component such as ScienceProfile will be therefore invisible or hidden from verifier 130. In other aspects of the present invention, holder 120 may highlight block 511 from receipt 400 and delete it from being viewed by verifier 130.

Figure 16:
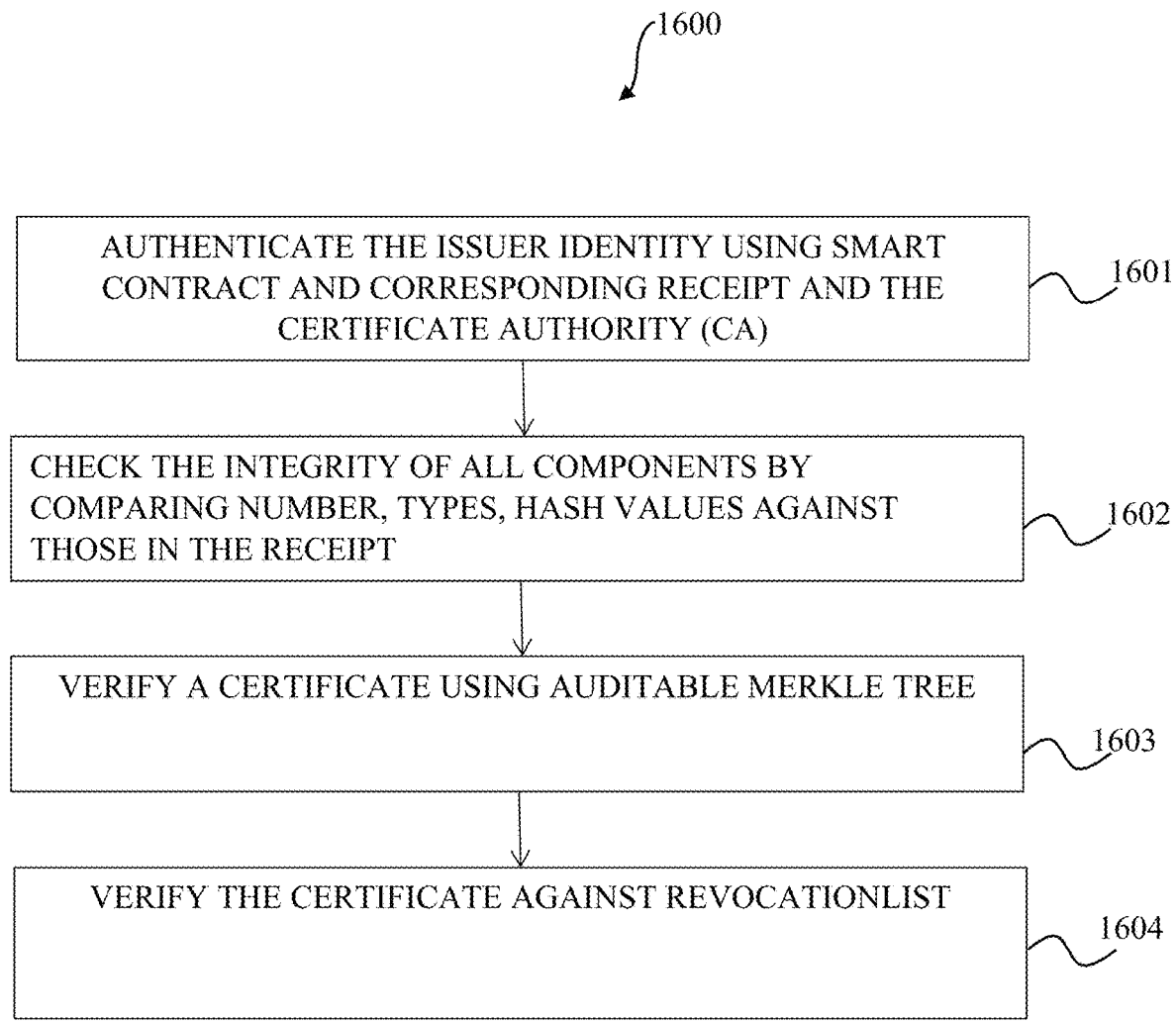
FIG. 16 shows a method for revoking a credential issued in accordance with an exemplary embodiment of the present invention.

Finally, referring to FIG. 16, a method 1600 for verifying a certificate by the verifier in accordance with an exemplary aspect of the present invention is illustrated. In the present invention, verifiers 130 can verify a credential issued by system 100 using certificate 140-3 (or 1021), receipt 300, and the Ethereum platform 221 without contacting issuer 110. Method 1600 includes the following steps: 1. Checking the receipt information and the issuer's information—The issuer's X.509 certificate—The signature of the Ethereum account used to issue the credential.—Validity of the owner of the smart contract on Ethereum.—The name of the issuer in the smart contract and the name on the X.509 certificate. 2. Checking the integrity of all components of the credential. This step checks the number, the type and the hash value of the files against the value stored on the receipt. 3. Checking the validity of the components in the certificate. This step checks the hash value and proofs to confirm whether the credential belongs to the auditable Merkle tree whose root node is published on the blockchain ecosystem. 4. Checking whether the certificate is revoked. This step checks if the mandatory component of the credential in the list of revoked credentials stored in the smart contract on the blockchain ecosystem.

More specifically, at step 1601, the issuer identity is authenticated. Step 1601 is implemented in system 100 with a progress bar for each step as shown in FIG. 10A. On the other hand, verifier 130 can perform method 1600 on their own. Once received credential 1021 and its receipt 300, verifier 130 can extract all the data to verify credential 1021 without the involvement of issuer 110. Then with a connection to the Ethereum platform 221 and any publicly available tools to verify a digital signature and a X.509 certificate, issuer 130 can finish the verification procedure. Referring back to FIG. 10A, step 1601 includes 1002 and 1003. Verifier 130 authenticates the identity of issuer 110 using the information in box 405 in FIG. 4.

Next, at step 1602, the integrity of all components are checked by comparing the number, type, and the title against those in the receipt. Step 1602 is realized by checking the Hash values of each components in box 404. The total number of components are listed one by one from top to bottom, "id". "Name" such as Transcript, ScienceProfile. The type is "mandatory=true" or "mandatory=false "(optional).

Next, at step 1603, the Hash values of the certificate is checked against the auditable Merkle tree. Step 1603 is realized by system 100 and more particularly by box 404 in receipt 400. The Hash value of adjacent component 714 and the one in the next higher level 721 are provided. With these two Hash values and the Hash value of the component to be checked, i.e., 713, the Hash value of root node 699 can be calculated by passing these values to the Hash function (i.e., SHA-256).

At step 1604, the certificate is checked whether it is revoked against the revocation list provided by the issuer. Since issuer 110 enables the revocation, reasons, and the revocation list in smart contract 300—see block 308 which creates the revocation option for issuer 110—verifier 130 can verify if a component is revoked by reviewing RevocationList and the reasons by "string memory reason".

Security Analysis In this section, we analyse the security aspects of our digital credential management system based on the STRIDE threat model [9]. This model specifies six security risks in an information system, with STRIDE as the initials for those types of risks, including: Spoofing identity, Tampering with data, Repudiation, Information disclosure, Denial of service, and Elevation of privilege. Other security features like authenticity, originality are also analysed. In the digital credential management system, there are the following entities: credential issuer, credential holder/credential owner, and credential verifier. We assume that there are attackers who are attempting to breach the security of this system in order to gain information or to forge credentials.

Security Analysis

The security aspects of system 100 based on the STRIDE threat model [9] is analyzed. This model specifies six security risks in an information system, with STRIDE as the initials for those types of risks, including: spoofing identity, tampering with data, repudiation, Information disclosure, denial of service, and elevation of privilege. Other security features such as authenticity, originality are also analyzed. In system 100, there are the following stakeholders: credential issuer (issuer) 110, credential holder/credential owner (holder) 120, and credential verifier (verifier) 130. There are attackers who are attempting to breach the security of system 100 in order to gain information or to forge credentials.

Authenticity and Protection Against Spoofing Identity

When an attacker A wants to impersonate a credential issuer 110 to issue fake credentials, the attacker A needs to possess the private key of credential issuer 110 to create a valid transaction in order to store fake credentials into blockchain ecosystem 170. With the private key protection mechanism such as PKI 160 is already in place, A cannot impersonate the credential issuer 110 because the private key is similar to a password which is encrypted and checked by PKI 160. Without private key, attacker cannot create transactions under issuer 100 name. Another way is to forge the account of issuer 100. However, in system 100, the accounts of issuer 110 are verifiable via X.509 certificates. X.509 certificates are similar to personal passports. Thus, forging the accounts of issuer 110 is equivalent to creating fake passport, which is infeasible. Since it is impossible to forge valid X.509 credentials because system 100 checks the authenticity of its generated credentials. Any credentials in system 100 are verifiable to prove its authenticity by hashing the credentials together with other personal information given in issuer receipt 400 to compute root node 699 of auditable Merkle tree 600. Then system 100 compares it against the value stored in blockchain ecosystem 170. Because the Hash function in this scheme is secure, it is infeasible to forge credentials that could yield the same hash value as the corresponding root node 699 of auditable Merkel tree 600 in blockchain ecosystem 170.

Integrity of Users's Credentials (Protection Against Tampering)

The credentials of holder 120 are stored in the receipts 300 provided by system 100, and their verification information is kept in blockchain ecosystem 170. In order to modify a user's credential, an attacker A needs to modify both receipt 400 and its record stored blockchain ecosystem 170 to make the modified credential valid. Since the most important property of the blockchain ecosystem 170 is immutability, it is impossible to modify any transaction once it had been committed into blockchain ecosystem 170. Therefore, modifying or deleting credential data of system 100 stored on the blockchain ecosystem 170 is impossible for any attacker. Once digital credentials (e.g., 140-3) are issued, they are not legitimately alterable by any entity including issuer 110 of the digital credentials. The only way that issuer 110 updates any credential is by revoking the current credential and issuing a new one. In addition, it is also impossible for an attacker A to cherry-pick identity components from different credentials to form a valid credential because identity components of a credential of the user Ul are combined into one input to generate a Hash value H; this Hash value is used as the value of a leaf node of auditable Merkle tree 600. Assume that the used Hash function is secure, it is infeasible to find another input combination that generates the same hash value H.

Originality and Repudiation

In system 100, the ID of issuer 110 in blockchain ecosystem 170 is digitally signed using the private key corresponding to the public key in the X.509 certificate of issuer 110. The X.509 certificate contains bibliographical information regarding issuer 110 such as the organization field, address, email, and accreditation. These bibliographical information had been verified by the certificate authority (CA) at registration time. The X.509 certificate of the issuer 110's organization field is stored in the read-only variable institute of smart contract 300. Thus, the originality of the credentials can be ensured by verifying the X.509 certificate of issuer 300 using digital signature verification of issuing CA's public key. Then the organization name in the X.509 certificate is compared against the institute variable in smart contract 300's institute variable (see line 302 in FIG. 3). Once issuer 110 committed a set of credentials (e.g., 140-1, 140-3, . . . , 140-N) into blockchain ecosystem 170, it cannot deny issuing those credentials since its identity is tied to a public X.509 certificate and not anonymous. All information posted on the blockchain ecosystem 170 by the issuer 110 will always be traced back to the credential issuer. Thus, it is impossible to impersonate issuer 110 as analyzed above.

Protection Against Information Disclosure in the IU-Certification System.

The private keys of the digital signatures and the Ethereum account are kept secret is the personal passwords while public keys are published. These private keys are stored in private places, not on the public blockchain ecosystem 170. It is infeasible for any attacker to compute private keys from public keys or Ethereum accounts. Therefore, there is no risk of exposing the secret keys on public blockchain ecosystem 170. The issued digital credentials are available in issuer receipts 400 which are in plaintext. The verification information is the hash of these credentials and stored in blockchain ecosystem 170. Obtaining the blocks in blockchain ecosystem 170 containing verification information does not reveal credentials of issuer 110. Therefore, the credentials of issuer 110 are only disclosed within their discretion.

Denial of Service

The IU-certification service runs on the blockchain ecosystem 170. The goal of a denial-of-service attack is to prevent digital credentials from verifying or issuing on Ethereum 221. Since blockchain ecosystem 170 is a distributed system, it is not possible to crash or misappropriate the computing power of all the nodes on blockchain ecosystem 170 for a denial-of-service attack. Therefore, system 100 is immune to a denial-of-service attack.

Elevation of Privilege

The highest authority in system 100 is the authority of issuer 100. This right is guaranteed by a digital signature. Only the owner of secret private key can create a valid digital credential on blockchain ecosystem 170. Therefore, no attacker can gain authority (certificate issuer's authority) on system 100 unless they obtain the private keys of issuer 110. With the above STRIDE model analysis and evaluation for system 100. Thus, system meets the desired security objectives of the present invention.

Experiments and Verifications

The prototype of system 100 was built to achieve the following objectives: (1) evaluate the feasibility or the proof of concept of the IU-certification unit 150 and (2) the cost of sending transactions in system 100 was measured.

System 100 ("system 100") was implemented as described above in FIG. 1 and FIG. 2. certification unit 150 was built as a website of Ethereum via Javascript API Web3.js in which a function called web3.eth.contract was used. A set of smart contracts on blockchain ecosystem 170 that works as IPFS storage for proofs of existence of all credentials and the verification algorithm. The website is implemented with Javascript and ReactJS to provide functions and interfaces for all management procedures for issuer 110, holders 120, and verifier 130. From the website, the Web3.js library is used to deploy and interact with smart contracts 223 in blockchain ecosystem 170 directly from the user's browser through a cryptocurrency wallet 212 such as Metamask1. The Cert smart contract was implemented using Solidity 222 and its instances are deployed to the public Ethereum 221 such as Ropsten Testnet for the testing purpose.

The cost of transactions was one of the main concerns of any blockchain-based system. System 100 defines one smart contract named Cert, and deploys one instance of the contract for each batch of credentials (refer to FIG. 1 and FIG. 2). Thus, the cost of using blockchain ecosystem 170 in IU-certification unit 150 is the cost of interactions with the deployed contract 300 which consists of 1 constructor and 3 functions including revoke, is Valid and verify.

System 100 was analyzed by running experiments over the Ethereum Ropsten Testnet. Table 2 depicts the cost of deployment an instance of Cert contract 300 and the cost of execution of each function in terms of gas consumption where we set the gas price to 50 Gwei=10-9 Ether, and the price of one Ether to $3000. The table shows that the deployment of the smart contract is the most expensive transaction, followed by the transaction to the revoke function. And the transactions to the remaining functions is Valid and verify cost nothing since these functions only read the data from smart contract 300 without changing any state in blockchain ecosystem 170. Although the deployment is the most expensive transaction, it is worth noting that the deployment of the Cert smart contract 300 always consumes a fixed amount of gas irrespective of the number of issuing credentials in the batch. It is because smart contract 300 stores only the root node 699 of the Merkle tree 600 representing the whole batch of credentials.

TABLE 2

Transaction Gas Consumption for Smart Contract Functionalities

| Function | Task | Transaction gas | Actual cost (Ether) | USD ($) |
|---|---|---|---|---|
| Cert. constructor | Deployment | 830,264 | 0.0415132 | 124.54 |
| Cert. revoke | Transaction | 47,996 | 0.0023998 | 7.20 |
| Cert. is Valid | Call | 0 | 0 | 0 |
| Cert. verify | Call | 0 | 0 | 0 |

Benefits of Inventions

The present invention provides a new methods and systems for managing credentials with selective disclosure/hiding on a block chain that can be used to save time, effort, and management cost of the credentials issuing process while ensuring their security and privacy. The system can be used in the managing credentials or certifications are carried out regularly in many areas of social life; saves time compared to traditional processes used by many institutions and government which are currently being implemented with many requirements and strict inspection steps; and solved the traditional fake certificate/diploma. In particular, the system in the present invention is the first to support multi-component credentials/certificates and allows users to select components to share, while still ensuring security and privacy.

The present invention design and security evaluation of system with procedures for multi-component credentials/certificates, procedures for verifying credentials/certificates, procedures for selecting the optional components to be disclosed and procedures for revoking credentials/certificates issued. Furthermore, the credentials verification process is designed so that it can be performed independently by the verifier, without contacting the issuer. This feature saves a lot of time and effort for the user/verifiers.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should, therefore, be construed in accordance with the appended claims and any equivalents thereof.

REFERENCE

1. Buldas, A., Draheim, D., Nagumo, T., Vedeshin, A.: Blockchain technology: intrinsic technological and socio-economic barriers. In: Dang, T. K., K"ung, J., Takizawa, M., Chung, T. M. (eds.) FDSE 2020. LNCS, vol. 12466, pp. 3-27. Springer, Cham (2020). https://doi.org/10.1007/978-3-030-63924-21.
2. CINECA: BESTR: Italian digital credentialing platform. https://bestr.it/. Accessed 23 Jul. 2021 IU-SmartCert 309
3. Consortium, D. C.: Building the digital credential infrastructure for the future. https://digitalcredentials.mit.edu/. Accessed 23 Jul. 2021.
4. Feige, U., Fiat, A., Shamir, A.: Zero-knowledge proofs of identity. J. Cryptol. 1(2), 77-94 (1988).
5. Foundation, C.: Malta, the First Nation State to deploy Blockchain in Education Pilots. https://connect-edlearning.edu.mt/malta-first-nation-state-to deploy-blockchain-in education/. Accessed 23 Jul. 2021
6. Gallersd"orfer, U., Matthes, F.: AuthSC: mind the gap between web and smart contracts. arXiv preprint arXiv: 2004.14033 (2020)
7. Grech, A., Camilleri, A. F.: Blockchain in education. Publications Office of the European Union, Luxembourg (2017)
8. Gr"ather, W., Kolvenbach, S., Ruland, R., Sch"utte, J., Torres, C., Wendland, F.: Blockchain for education: lifelong learning passport. In: Proceedings of 1st ERCIM Blockchain Workshop 2018. European Society for Socially Embedded Technologies (EUSSET) (2018)
9. Howard, M., Lipner, S.: The security development lifecycle, vol. 8. Microsoft Press Redmond (2006).
10. Kuszmaul, J.: Verkle trees. Verkle Trees, pp. 1-12 (2019)
11. Lab, M. M., Machine, L.: Blockchain Credentials. http://blockcerts.org/. Accessed 23 Jul. 2021
12. Lemoie, K., Soares, L.: Connected impact. Unlocking education and workforce opportunity through blockchain (2020). https://www.acenet.edu/Documents/ACE-Education-Blockchain-Initiative-Connected-Impact-June2020.pdf
13. Merkle, R. C.: A certified digital signature. In: Brassard, G. (ed.) CRYPTO 1989. LNCS, vol. 435, pp. 218-238. Springer, New York (1990). https://doi.org/10.1007/0-387-34805-021
14. Mukta, R., Martens, J., Paik, H. Y., Lu, Q., Kanhere, S. S.: Blockchain-based verifiable credential sharing with selective disclosure. In: 2020 IEEE 19th International Conference on Trust, Security and Privacy in Computing and Communications (TrustCom), pp. 959-966. IEEE (2020)
15. Nakamoto, S.: Bitcoin: a peer-to-peer electronic cash system. Decentralized Business Review, p. 21260 (2008)
16. Nguyen, B. M., Dao, T. C., Do, B. L.: Towards a blockchain-based certificate authentication system in Vietnam. Peer J. Comput. Sci. 6, e266 (2020)
17. Nguyen, D. H., Nguyen-Duc, D. N., Huynh-Tuong, N., Pham, H. A.: CVSS: a blockchainized certificate verifying support system. In: Proceedings of the Ninth International Symposium on Information and Communication Technology, pp. 436-442 (2018)
18. Sharples, M., Domingue, J.: The blockchain and kudos: a distributed system for educational record, reputation and reward. In: Verbert, K., Sharples, M., Klobu-car, T. (eds.) EC-TEL 2016. LNCS, vol. 9891, pp. 490-496. Springer, Cham (2016). https://doi.org/10.1007/978-3-319-45153-448
19. Turkanovic, M., Holbl, M., Kosic, K., Hericko, M., Kamisalic, A.: EduCTX: a blockchain-based higher education credit platform. IEEE Access 6, 5112-5127 (2018).
20. Wood, G., et al.: Ethereum: a secure decentralised generalised transaction ledger.
Ethereum Project Yellow Paper 151(2014), 1-32 (2014).

DESCRIPTION OF NUMERALS

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should, therefore, be construed in accordance with the appended claims and any equivalents thereof.

100 blockchain based credential system with selective disclosure
110 issuers (employer, universities, stakeholders)
111 issuer receipt
120 holder (students, applicants, candidates, stakeholders)
121 holder receipt
130 verifiers (employer, universities, stakeholders)
131 verifier receipt
140 original batch of certificates before selection
140-1 certificate of a first holder in batch
140-2 certificate of a second holder in batch
140-3 a sample certificate
140-N certificate of $N^{th}$ holder in batch
141O1 first optional component (attribute)
141O2 second optional y component
141O3 third optional component
141M mandatory component
149-1 Hash value of first certificate
149-3 Hash value of the sample certificate
149-N Hash value of $N^{th}$ certificate
150 UI-certification unit
152 verifier certification unit
153 issuer certification unit
160 public signature interface (PKI)
170 blockchain ecosystem
171 a graphic user interface (GUI) or front end
171-1 issuer GUI or issuer front end
171-2 holder GUI or holder front end
171-3 verifier GUI or verifier front end
180 a successfully verified certificate
181 the optional component 182 the first mandatory component
183 the second mandatory component
199 P2P communication link (or internet link)
200 UI SmartCred unit at service and data layer.
210 client layer
211 Application front-end (or GUI)
212 Metamask Wallet
221 Ethereum platform including Ethereum Virtual Machine (EVM)
222 Solidity programming
223 smart contracts.
300 smart contract
301 Solidity compiler version
302 state variable for issuer is declared immutable
303 state variable for auditable Merkle tree root node
304 immutable variable for a first attributed is defined
305 immutable variable for a second attribute is defined
306 revocationList is mapped into a string
311 issuer construction block
312 revoke function block
313 verify function block
314 MT verify function block
400 receipt
401 date stamp
402 transaction Hash value
403 contract address
404 component information block
404-1 numeral order of component
404-2 title of component
404-3 type of component (mandatory or optional)
404-4 Hash value of adjacent component
404-5 Hash value of adjacent next level
404-6 Hash value of root node
404-7 Hash value of component to be verified
405 issuer information block
405-1 issuer account Hash value (or public key)
405-2 issuer signature (digital certificate)
405-3 issuer certificate chain
500A holder receipt in which ScienceProfile is shown
500B holder receipt in which ScienceProfile is deleted from view
511 ScienceProfile section or the optional component
600 Auditable Merkle tree
699-11 first level Hash value and Attributes for data 1
699-12 first level Hash value and Attributes for data 2
699N first level Hash value and Attributes for data N
699-21 first level leaf node for data 1 and data 2
699-1N first level leaf node for data 699-1(N−1) and 6991N
699-21 second level leaf node for 699-11 and 699-12
699-2M second level leaf node for 699-1(N−1) and 699-1N
699-31 third level leaf node for 699-21, 699-22
699-3P third level leaf node for 699-2(M−1) and 699-2M
699 Root node
700 a section of Merkle tree for root node verification
701 identity of component 3, i.e., ScienceProfile
702 type of component 3 (to be verified)
703 content of component 3 (to be verified)
711 first data containing hash value and attributes
712 second data
713 third data (to be verified)
714 fourth data
721 parent leaf node for first data and second data
722 parent leaf node for third data and fourth data
731 root node
751 Hash value calculation of third data and the adjacent data
752 Hash value calculation of leaf node 722 to root node 731
800 Issuer GUI (issuer browser page or issuer front end)
801 certificate browser box
802 certificate indicator box
803 component setting box
804 component setting status box
805 certificate issue box
806 revocation box
811 blockchain receipt download box
900 holder GUI (holder browser page or front end)
901 receipt browser box
902 receipt information box
903 component selection box
904 download box
1000A verifier GUI (verifier browser or front-end)
1001 step 1: drop blockchain receipt into dropbox
1002 step 2: verify issuer ID using metadata in rsmart contract
1003 step 3: load digital certificate
1004 step 4: verifying smart contract with auditable Merkle tree
1005 step 5: verifying RevocationList
1006 step 6: done
1000B display
1010 display of institute (issuer) information section
1011 batch of certification information box
1012 digital certificate
1021 certificate file (pdf, Word, text, etc.)
1100 revocation GUI (front end)
1101 student blockchain receipt box
1102 receipt selection indicator box
1103 receipt information inquiry box
1104 digital certificate inquiry box
1111 certificate dropbox
1112 certificate information box
1121 revocation reason box
1122 revocation activation button

The invention claimed is:

1. A method for managing credentials with selective disclosure/hiding on a blockchain ecosystem, comprising:
(a) providing mandatory components and optional components to each of a plurality of digital certificates using a smart contract of said blockchain ecosystem, wherein said optional components are characterized to be invisible to verifiers when they are unselected;
(b) publishing said plurality of digital credentials in batch to said blockchain ecosystem;
(c) generating an auditable Merkle tree wherein each leaf node and a root node includes Hash values and attributes of children leaf nodes by adding an extracting and combining function at each of said root node and said leaf nodes; and
(d) verifying said plurality of digital certificates using said auditable Merkle tree and said smart contract and information on issuer receipts generated by said blockchain ecosystem upon the receipt of said smart contract by (i) extracting a first Hash value and a first attribute of a certificate to be verified, a second Hash value and a second attribute of an adjacent certificate paired to said certificate to be verified, a third Hash value and a third attribute from a third certificate located in a leaf node one level higher and adjacent to a parent leaf node of said first Hash value and said second Hash value; (ii) deriving a Hash value of said root node from said first Hash value, said second Hash value and said third Hash value, wherein said steps above obey iterative equations:

$$Hash_i^j = Hash(Hash_{i-1}^{j-1}, Hash_i^{j-1})$$

$$Attr_i^j = Combine(Attr_{i-1}^{j-1}, Attr_i^{j-1})$$

wherein i, j are positive integers; i representing number of said plurality of certificates, and j representing a height of said auditable Merkle tree.

2. The method of claim 1 further comprises:
(e) revoking any of said plurality of digital certificates by providing a revocation function in said smart contract; and
(f) providing a list of revoked certificates and reasons for revoking in said smart contract.

3. The method of claim 1 wherein said step (c) of generating an auditable Merkle tree further comprises:
(i) pairing up two adjacent certificates among said plurality of certificates;
(ii) concatenating said two adjacent certificates and passing through a Hash function unit to form a second level leaf node where attributes of said two adjacent certificates are combined and stored;
(iii) pairing up said second level leaf nodes;
(iv) concatenating two adjacent leaf nodes at said second level and passing them through said Hash function unit to form a third level leaf node where said attributes of said two adjacent leaf nodes at said second level are combined and stored; and
(v) continuing steps (i) to (iv) until a root node is achieved.

4. The method of claim 2 further comprising:
(g) verifying said plurality of certificates by comparing information on said issuer receipt and those in said smart contract; and
(h) checking said plurality of certificates against said list of revoked certificates.

5. The method of claim 4 further comprising:
(i) selecting said optional components to hide by selecting only optional components to disclose using a front-end page of a holder.

6. The method of claim 5 wherein said selecting said optional components comprises selecting and removing said optional components in said issuer receipt.

7. The method of claim 5 further comprising using said front-end page of said holder to generate a holder receipt that contains only said mandatory components and said selected optional components.

8. The method of claim 1 further comprising:
(iii) authenticating credentials of said issuer using a private key and a digital signature, and bibliographical information of said issuer; if said credentials are verified then signing said credentials using a X-509 public key infrastructure (PKI).

9. The method of claim 8 further comprising: transmitting said credentials, said smart contract, and said plurality of certificates using said issuer front-end page.

10. A blockchain-based system, comprising:
(v) a certification unit attached to and operable in cooperation with an Ethereum platform to: (i) provide an issuer graphic user interface (GUI) page, a holder GUI, and a verifier GUI; (ii) providing mandatory components and optional components to each of a plurality of digital certificates using a smart contract of said Ethereum platform, wherein said optional components are characterized to be invisible to verifiers when they are unselected; (iii) publish said plurality of digital credentials in batch to said Ethereum platform; (iv) generate an auditable Merkle tree wherein each leaf node and a root node includes Hash values and attributes of children leaf nodes by adding an extracting and combining function at each of said root node and said leaf nodes; and (v) verify said plurality of digital certificates using said auditable Merkle tree and said smart contract and information on issuer receipts generated by said Ethereum platform upon the receipt of said smart contract by (a) extracting a first Hash value and a first attribute of a certificate to be verified, a second Hash value and a second attribute of an adjacent certificate paired to said certificate to be verified, a third Hash value and a third attribute from a third certificate located in a leaf node next level higher and adjacent to a parent leaf node of said first Hash value and said second Hash value; (b) deriving a Hash value of said root node from said first Hash value, said second Hash value and said third Hash value, wherein said steps above obeys iterative equations:

$$Hash_i^j = Hash(Hash_{i-1}^{j-1}, Hash_i^{j-1})$$

$$Attr_i^j = Combine(Attr_{i-1}^{j-1}, Attr_i^{j-1})$$

wherein i, j are positive integers and i representing number of said plurality of certificates, j representing a height of said auditable Merkle tree; and
(h) a public key infrastructure (PKI) unit coupled to said Ethereum platform and said certification unit via a world wide web.

11. The system of of claim 10 wherein said issuer GUI is operable to:
revoking any of said plurality of digital certificate by providing a revocation function in said smart contract; and
providing a list of revoked certificates and reasons for revoking in said smart contract.

12. The system of claim 10 wherein said smart contract causes said Ethereum platform to form said Merkle tree comprises an algorithm:
(i) pairing up two adjacent certificates among said plurality of certificates;
(j) concatenating said two adjacent certificates and passing through a Hash function unit to form a second level leaf node where attributes of said two adjacent certificates are combined and stored;
(k) pairing up said second level leaf nodes;
(l) concatenating two adjacent leaf nodes at said second level and passing them through said Hash function unit to form a third level leaf node where said attributes of said two adjacent leaf nodes at said second level are combined and stored; and
(m) continuing steps (i) to (iv) until a root node is achieved.

13. The system of claim 2 wherein said verifier GUI is operable to:
- (iv) verify said plurality of certificates by comparing information printed on said issuer receipt and those in said smart contract; and
- (v) check said plurality of certificates against said list of revoked certificates.

14. The system of claim 13 wherein said holder GUI is operable to: select said optional components to hide by selecting only said optional components to disclose using a front-end page of a holder.

15. The system of claim 14 wherein said holder GUI is operable to enable said holder to select and remove said optional components in said issuer receipt.

16. The system of claim 15 wherein said verifier GUI is operable to generate an issuer receipt that contains only said mandatory components and said selected optional components.

17. The system of claim 15 wherein said PKI unit is operable to authenticate credentials of said issuer using a private key and a digital signature, and bibliographical information of said issuer; if said credentials are verified then signing said credentials using a X-509 public key infrastructure (PKI).

18. The system of claim 17 wherein said certificate unit further comprises:
- an issuer a certification unit operable to publish said plurality of certificates to said Ethereum platform; and
- a verifier certification unit operable to assist said verifier in authenticating and verifying said holder receipt and said plurality of certificates after being selected by said holder.

* * * * *